United States Patent [19]

Glinsmann

[11] 4,125,156
[45] Nov. 14, 1978

[54] AQUEOUS SURFACTANT SYSTEMS FOR IN SITU MULTIPHASE MICROEMULSION FORMATION

[75] Inventor: Gibert R. Glinsmann, Bartlesville, Okla.

[73] Assignee: Phillips Petroleum Company, Bartlesville, Okla.

[21] Appl. No.: 804,132

[22] Filed: Jun. 6, 1977

[51] Int. Cl.² ............................................. E21B 43/22
[52] U.S. Cl. .................................... 166/252; 166/273; 166/274; 252/8.55 D
[58] Field of Search ............... 166/252, 273, 274, 275; 252/8.55 D

[56] References Cited

U.S. PATENT DOCUMENTS

| | | | |
|---|---|---|---|
| Re. 29,219 | 5/1977 | Flournoy et al. | 166/252 |
| 3,330,344 | 7/1967 | Reisberg | 166/274 |
| 3,371,710 | 3/1968 | Harvey et al. | 166/273 |
| 3,373,809 | 3/1968 | Cooke, Jr. | 166/273 |
| 3,444,930 | 5/1969 | Williams et al. | 166/273 |
| 3,446,282 | 5/1969 | Cooke, Jr. | 166/274 |
| 3,467,190 | 9/1969 | Dunlap et al. | 166/273 X |
| 3,561,530 | 2/1971 | Tosch | 166/252 |
| 3,885,628 | 5/1975 | Reed et al. | 166/252 |
| 3,938,591 | 2/1976 | Ossip et al. | 166/252 X |
| 3,981,361 | 9/1976 | Healy | 166/252 |

OTHER PUBLICATIONS

Cash et al. SPE Paper 5813, "Modeling Crude Oils for Low Interfacial Tension," Mar. 22, 1976.

Primary Examiner—Stephen J. Novosad
Assistant Examiner—George A. Suchfield

[57] ABSTRACT

The optimum aqueous surfactant system for forming an efficient multiphase microemulsion system in situ is determined by comparing the behavior of oil from the formation to be flooded with the behavior of simple hydrocarbons in an equilibration test with a standard surfactant system. Thereafter, salt concentration, equivalent weight of the sulfonate and/or alcohol solubility is varied based on criterion disclosed herein to arrive at the optimum system for recovery of the specific oil in question.

39 Claims, 20 Drawing Figures

AQUEOUS SURFACTANT SYSTEMS FOR IN SITU MULTIPHASE MICROEMULSION FORMATION

BACKGROUND OF THE INVENTION

This invention relates to recovery of oil from a subterranean reservoir through the use of a surfactant-cosurfactant system.

It has long been known that the primary recovery of oil from a subterranean formation leaves a substantial amount of the initial oil still in the formation. This has led to the use of what is commonly referred to as secondary recovery or water flooding wherein a fluid such as brine is injected into a well to force the oil from the pores of the reservoir toward a recovery well. However, this technique also leaves substantial amounts of oil in the reservoir because of the capillary retention of the oil. Accordingly, it has been suggested to use surfactants in waterflooding processes. It has been found that the use of surfactants can reduce the interfacial tension between the oil and the water to such an extent that substantially increased quantities of oil can be displaced. These surfactants have been used in both systems forming microemulsions and those not forming microemulsions.

The microemulsions which have been proposed have been selected from compositions in the single phase region of a ternary diagram. Such microemulsion systems can be either oil-external microemulsions or water-external microemulsions. When such microemulsion systems are used, it is viewed that the initial stages of oil recovery involve an efficient miscible displacement with subsequent involvement of immiscible displacement upon a breaking down of the microemulsion into multiphases upon dilution of the microemulsion with crude oil and resident water at its leading edge and dilution with an aqueous drive fluid at its trailing edge. Hence, optimization of such microemulsion surfactant flood systems is approached in terms of minimization of the multiphase region in the phase diagram so as to prolong miscible displacement, with low interfacial tensions in the multiphase regions so as to enhance immiscible displacement. From a practical standpoint, however, the development of effective microemulsion systems which can economically recover the crude oil from a subterranean formation suffers from certain drawbacks in that it is difficult to maintain the miscible displacement and it is difficult to obtain thereafter the low interfacial tensions necessary to provide effective immiscible displacement of the crude oil.

Surfactant systems have been developed which form microemulsions on contact with oil. One of the early patents describing such a technique is Cooke, Jr., U.S. Pat. No. 3,373,809 (Mar. 19, 1968) which discloses recovering oil through the formation of a microemulsion formed in situ by injecting a surfactant system. Cooke, Jr., took the approach that the effectiveness of such microemulsions was based on the formation of a single phase microemulsion with the formation oil and hence gave rather explicit instructions as to the technique to achieve the results desired, namely, the injection of a high concentration of surfactant. All systems discussed above can be quite effective because they establish a miscible condition, but the cost of the large quantity of surfactant required, which usually is in excess of about 7–15% by weight so as to provide a composition within the single phase region of the ternary diagram, can easily exceed the value of the oil recovered. It is becoming well recognized that it is impractical from an economic standpoint to maintain in a reservoir formation such a highly concentrated surfactant composition which remains effectively miscible (i.e., in the single phase region) throughout the lifetime of the surfactant flood as proposed by Cooke and others.

Recent work has led to the suggestion of injecting microemulsion systems wherein the microemulsion phase is immiscible with the resident fluids in the reservoir. Reed et al, U.S. Pat. No. 3,885,628 (May 27, 1975) propose to form a multiphase microemulsion system above ground by mixing oil, brine and surfactant and injecting at least the immiscible microemulsion phase. In some cases Reed et al suggest injecting one or more of the other phases which exist in equilibrium with the microemulsion phase along with the immiscible microemulsion phase. Later, work along this line is exemplified by Healy, U.S. Pat. No. 3,981,361 (Sept. 21, 1976) which describes procedures for producing surfactant systems above ground which are injected as an immiscible microemulsion. In this later case, emphasis is placed on injection of the single immiscible surfactant-rich microemulsion phase. Ossip et al, U.S. Pat. No. 3,938,591 (Feb. 17, 1976) also discusses the injection of immiscible microemulsion systems which as with Reed et al and Healy resist uptake of oil and water into the immiscible microemulsion phase. In all of these cases, the disclosed procedure has the obvious disadvantage of requiring the injection of a composition containing substantial amounts of oil which adds to the cost of the injected composition. In addition, there is the problem of achieving the optimum system for a given oil since it turns out that different oils behave differently.

Nowhere in the art is there any teaching of the use of an optimum aqueous surfactant system which is capable of forming a multiphase microemulsion system in situ, wherein said multiphase microemulsion system is highly effective in displacing the particular oil of interest.

SUMMARY OF THE INVENTION

It is an object of this invention to develop surfactantflood systems to which no oil is added to the injected composition.

It is a further object of this invention to provide a quick and systematic method of optimizing an aqueous surfactant system which is effective in forming a multiphase microemulsion system in situ in porous media, thereafter said microemulsion system being effective in recovering oil from the porous medium.

It is another object of this invention to develop surfactantflood systems which maintain effective oil displacement capabilities throughout the lifetime of the surfactant slug.

It is yet another object of this invention to tailor a surfactantflood composition to the particular characteristics of the oil being recovered.

It is a further object of this invention to design effective surfactantflood systems which have minimum surfactant adsorption loss in porous media.

It is yet a further object of this invention to sweep residual oil from the pores of a subterranean formation by means of a multiphase bank formed in situ.

In accordance with this invention, oil of the type found in the formation to be flooded is equilibrated with a standard aqueous surfactant system at various salinities and the resulting phase behavior compared with a series of the same standard surfactant systems equilibrated with pure hydrocarbons. Thereafter the salt concentration, equivalent weight of the sulfonate and/or alcohol solubility adjusted in accordance with defined criteria to arrive at an optimum aqueous surfactantflood composition for effective recovery of the particular oil.

Typically, the requirements of an optimum aqueous surfactant composition as disclosed herein will require the use of a cosurfactant in the surfactant composition. However, use of aqueous surfactant compositions designed as disclosed herein without the use of a cosurfactant is within the scope of this invention.

Herein, aqueous surfactant compositions refer to mixtures of brine, surfactant, and optionally a cosurfactant to which no oil has been added. These compositions do not preclude compositions prepared using surfactant wherein a small amount of unreacted or diluent oil are present as is frequently the case in commercial products. The surfactant system, after injection into the formation, takes up oil and brine from the formation to form a multiphase microemulsion in situ which microemulsion when complete is immiscible with the reservoir crude even though the interfacial tensions between the microemulsion crude oil and brine are very low.

BRIEF DESCRIPTION OF THE DRAWINGS

In the drawings forming a part hereof.

DESCRIPTION OF THE PREFERRED EMBODIMENTS

Figure 1:
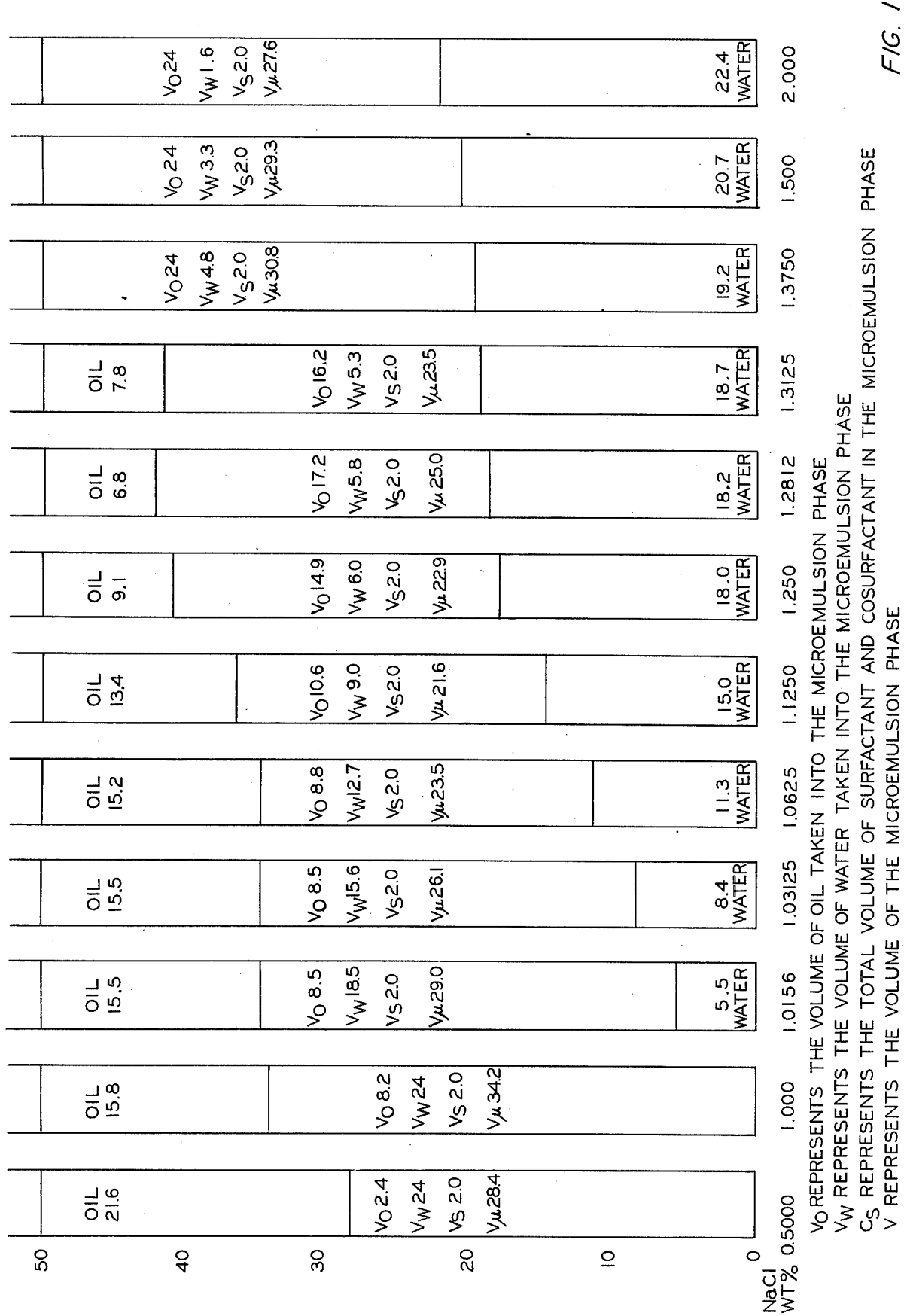
FIG. 1 is a bar graph showing the composition of equilibrated mixtures of oil and a surfactantcosurfactant system at progressively increasing salinity of the brine.

There are three fundamental advancements in the art in this invention. First, it has been discovered that relatively dilute aqueous compositions containing suitable surfactants and optionally cosurfactants can form a multiphase microemulsion system in situ in porous media, the resulting multiphase system being highly effective in recovering oil from the porous medium when optimized by the procedure disclosed herein. Hence, the type of surfactantflood process disclosed herein retains the inherent advantages of microemulsion systems while avoiding the added cost of using oil as a component in the injected composition.

Secondly, this invention discloses a method of characterizing crude oils with respect to optimizing surfactant compositions. Thereafter, an optimum aqueous surfactant composition can be determined which will form a multiphase microemulsion system in situ, said multiphase microemulsion being highly effective in recovering the particular crude oil from the reservoir formation of interest.

Thirdly, optimum surfactantflood systems developed as disclosed herein show locally minimized sulfonate retention losses in porous media.

As part of this invention, a test procedure has been developed which defines very quickly relative to a standard reference the choice of an optimum aqueous surfactant composition which will be most effective in displacing a particular oil of interest from reservoir porous media. To establish a standard reference, a series of pure hydrocarbons such as normal alkanes or alkylbenzenes are equilibrated with individual samples of a standard aqueous composition containing a constant concentration of the surfactant and optionally a cosurfactant wherein the salinity within each individual sample of aqueous composition is varied. (See Example I). For purposes of this invention, a homologous series of pure hydrocarbons having alkane or alkyl chains consisting of 6 to 16 carbons may be used. Typically, the "standard" surfactant used would be a synthetic or petroleum sulfonate with an average equivalent weight in the range of 350 to 500, but preferably on the lower end of this range, i.e., less than 420, preferably about 400 to 420, as opposed to the upper end of this range, 420 and greater. Preferred "standard" cosurfactants are those of intermediate water solubility (about 0.05-15 g/100 g water at 20° C.), most preferably isobutanol. The preferred "standard" concentration of the surfactant in the aqueous composition is about 1 to 7 weight percent active ingredient based on the weight of water, and more preferably 2 to 5 weight percent. The cosurfactant to surfactant ratio of the "standard" composition should be in the range of about 0.25:1 to 1.5:1, preferably about 0.5:1 to 1.0:1. Typically, a one to one volume ratio of "oil" and aqueous surfactant composition is used in the tests, but as will be shown in subsequent examples, the value of this ratio is not critical in determining an optimum aqueous surfactantflood composition. As can be seen from FIG. 5, a volume ratio of from 1:2 to 2:1 can be used as can greater or lesser amounts of either component.

Figure 7:
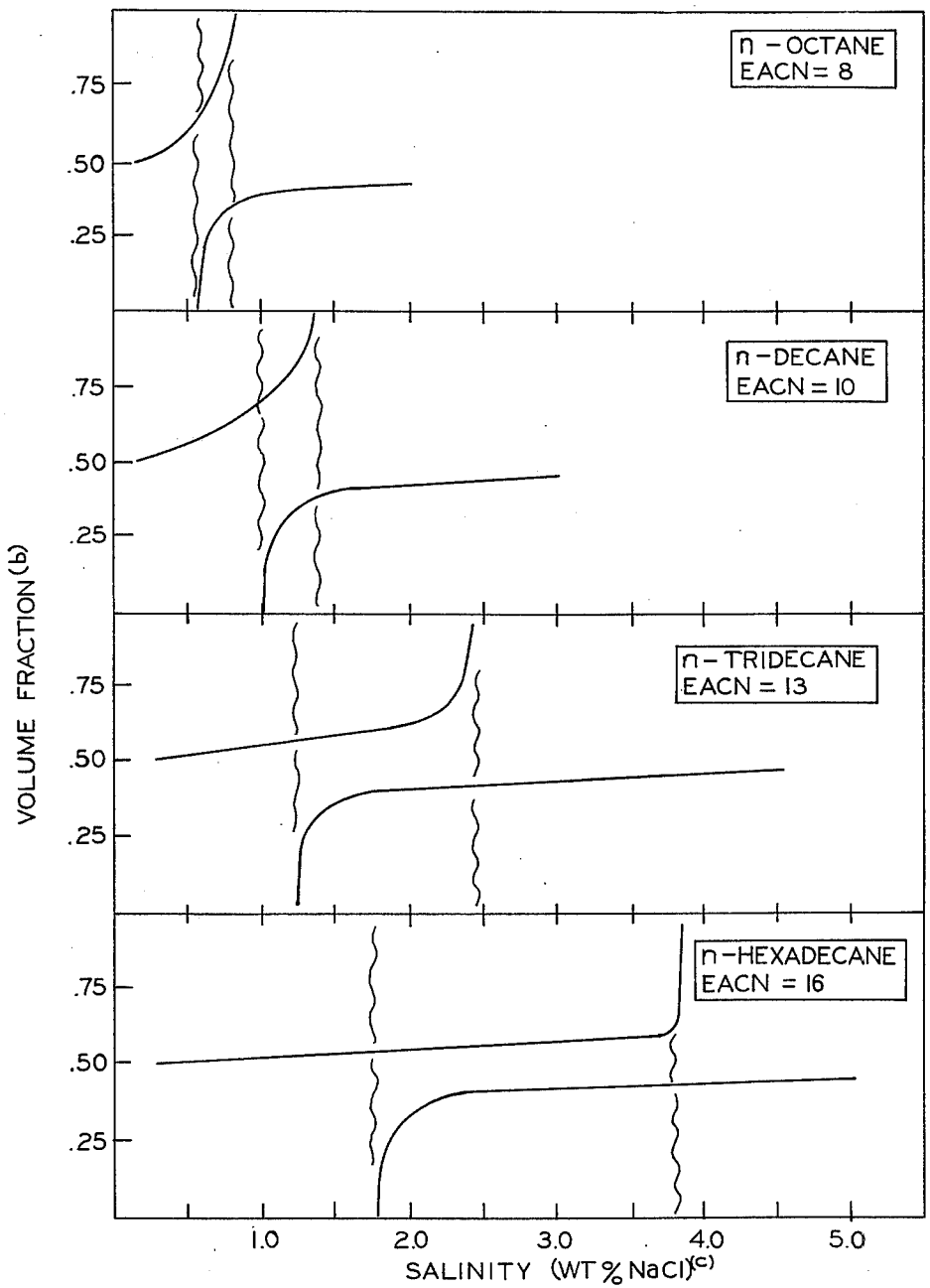
FIG. 7 shows the effect of different alkane carbon chain lengths on phase volume behavior of varying the chain length of simple straight chain alkanes.

A series of phase volume diagrams can be constructed based on such a series of tests wherein the volume fraction of the varios phases is determined and plotted as a function of the salinity which was varied in the series of tests. FIG. 7 shows an example of the phase volume behavior which is obtained when a particular "standard" aqueous surfactant composition was equilibrated at various salinities with various n-alkane hydrocarbons.

While crude oil is made up of complex molecules having broad distributions of molecular species, these oils interact with anionic surfactants in the same manner as simple hydrocarbons having about 6 to 16 alkane carbon atoms. Hence, an effective alkane carbon number (EACN) can be assigned to a particular crude oil by comparing its corresponding phase volume diagram which is obtained when equilibrated with the standard surfactant compositions, to those for the pure hydrocarbons wherein the EACN of the pure hydrocarbon is equal to the number of alkane carbon atoms in the molecule. In the practice of this invention, a crude oil corresponding in composition to that in the formation to be flooded is equilibrated with the same standard surfactant system at various salinities and the resulting phase volume diagram compared with the standard diagrams (e.g., compare FIG. 7 and FIG. 8). the equilibration tests should be carried out as nearly as practical actually duplicating the characteristics of the oil in the formation, that is, utilizing oil which is either freshly recovered or treated with light components so as to compensate for any volatile components lost after recovery.

By comparing the phase volume diagrams obtained for the standard aqueous surfactant composition equilibrated with the crude oil with similar systems equilibrated with the pure hydrocarbons, an EACN can be assigned to the particular crude oil of interest. In general, the EACN of most crude oils as defined here will fall in the range of 5 to 16. For the given standard aqueous surfactant composition, it will be noted from the phase volume diagrams (e.g., see FIG. 7) that as the EACN of the oil increases, the range of salinity over which the three-phase region exists increases, and the relative uptake of oil and brine per unit of surfactant into the middle microemulsion phase in the three-phase region decreases.

It will be shown in the subsequent examples that maximum recovery of oil from porous media is obtained when aqueous compositions are used wherein said aqueous composition is chosen so as to correspond to that which yields a three-phase microemulsion system upon equilibration of said aqueous surfactant system with a substantially equal volume of said oil. Furthermore, it will be shown in the subsequent examples that maximum oil recovery is obtained using aqueous surfactant compositions as disclosed herein, wherein said aqueous surfactant composition upon equilibration with the said oil yields phase volume diagrams having relatively narrow ranges of salinity over which the three-phase region exists, and hence has relatively large uptake of oil and brine per unit of surfactant into the microemulsion phase as discussed more quantitatively hereinafter.

Hence, if the EACN of the particular crude oil of interest is determined to be relatively high (e.g., EACN = 13 to 16), then an aqueous surfactant composition containing a relatively high equivalent weight surfactant and/or a cosurfactant with lesser water solubility (relative to the standard surfactant and cosurfactant, respectively) is preferred since increasing the equivalent weight of the surfactant and/or decreasing the water solubility of the cosurfactant will decrease the range of salinity over which the three-phase region exists and increases the relative uptake of oil and brine per unit of surfactant into the microemulsion phase. Conversely, for oils having lower value EACN's, aqueous compositions containing lower equivalent weight surfactants and/or more water soluble cosurfactants are preferred.

Equivalent to increasing salt concentration is (1) increasing the hydrophobic content of the surfactant, or (2) decreasing the brine solubility of the cosurfactant. Thus, the relationships are as follows: (1) If the salt concentration is increased, then a surfactant with a relatively smaller hydrophobic content must be used and/or a more water-soluble alcohol must be used. (2) If a more water-soluble alcohol is used, then the hydrophobic content of the surfactant must be increased or the concentration of the salt must be increased. (3) If a surfactant with a relatively greater hydrophobic moiety is used, then the concentration of the salt must be decreased or an alcohol having a higher solubility must be used.

As a practical matter, oils having characteristics similar to the lower straight chain hydrocarbons tend to form three-phase regions over a narrow salt concentration range and at a relatively low salt concentration. See FIG. 7. If the oil in question forms a three-phase region over a broad range of salinity, the above relationships are used to achieve the optimum system by decreasing the three-phase salinity range. This requires increasing the equivalent weight of the sulfonate and/or using a less soluble alcohol.

Figure 2:
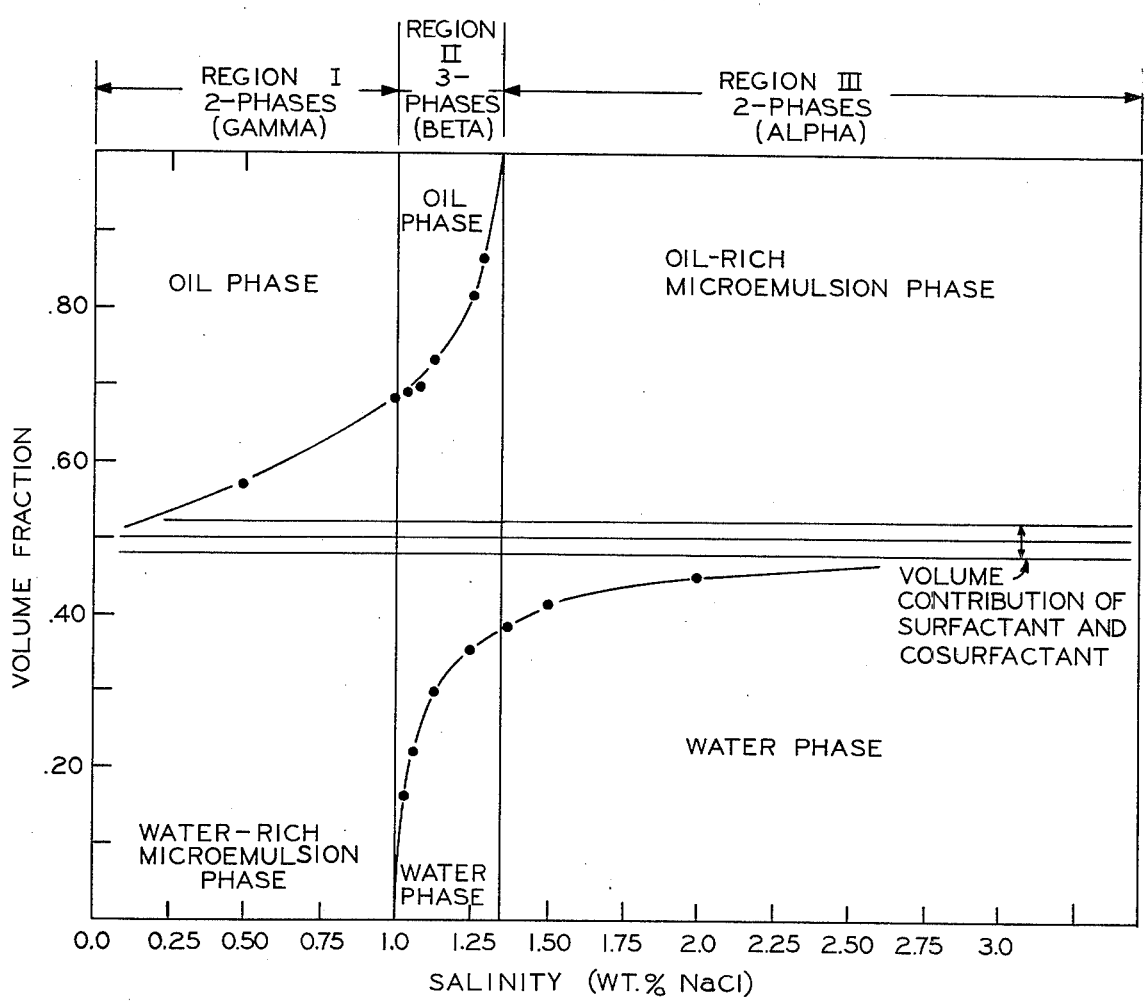
FIG. 2 is a phase volume diagram plotted from data such as that shown in FIG. 1.

Stated from the point of view of the optimized system, three phases, a predominately oil phase, a microemulsion phase, and a predominately aqueous phase, are formed in the optimized system over a narrow range of electrolyte concentration as compared with similar systems using a surfactant having a smaller hydrophobic portion and/or a more water-soluble cosurfactant. Generally, this narrower range over which formation of three phases occurs will be less than 1, preferably less than 0.5 weight percent based on the weight of water, i.e., three-phase partitioning over a salinity range of 0.5 to 0.75 weight percent electrolyte based on water would be over 0.25 of a percentage point, i.e., less than 1 and also less than one-half. In FIG. 2, for instance, a three-phase region occurs over about 0.35 percentage point of salt concentrations range, i.e., from about 1.00 to about 1.35. Good results are obtained in systems exhibiting three-phase partitioning over a salinity range of 0.1 to 1, preferably 0.1 to 0.5 percentage points.

More specifically in systems exhibiting formation of three phases over a narrow range of salinity, good oil recovery is achieved over about a one percentage point range of salinity encompassing the three-phase region and the higher salinity region immediately adjacent the three-phase region. See FIG. 10 which shows three-phase formation over a salinity range of about 0.9 to 1.3, i.e., 0.4 of a percentage point which is within the peripheral range of less than 0.5 set out above. However, good oil recovery is achieved over an entire 1 percentage point range of salinity (weight percent electrolyte concentration in water) encompassing the three-phase region and the higher salinity area immediately adjacent the three-phase region, i.e. from about 0.9 to about 1.9. Thus an alternative definition of the optimum system is that which forms three phases over a salinity range of less than one percentage point, the salinity range to be used being that 1 percentage point range beginning at the point three-phase formation begins and encompassing the three-phase region.

Generally, the surfactant system used to produce the standard phase-volume diagrams as shown in FIG. 7 utilizes a relatively low equivalent weight sulfonate and the corresponding cosurfactant and salt concentration to give three-phase partitioning over a narrow salinity range with a low EACN hydrocarbon. Generally, the oil to be produced will have a higher EACN and thus a higher equivalent weight sulfonate and/or a less soluble alcohol and a lower salt concentration will be used to achieve the optimum system for the oil to be produced.

However, since higher equivalent weight sulfonates tend to precipitate, and tend to adsorb to a greater extent in porous media, the equivalent weight of the sulfonate is increased only the minimum amount necessary to give three-phase behavior over a substantially narrower range of salinity, for instance over a range of less than 1 percentage point described above.

As outlined above, the aqueous surfactant composition which results in maximum oil recovery corresponds to one which when equilibrated with the oil of interest yields a three-phase system, said composition yielding a corresponding volume diagram which has a relatively narrow range of salinity over which the three-phase region exists. As taught here, oils which have relatively high EACN's will require relatively high equivalent weight surfactants. It should be noted that as the equivalent weight of the surfactant increases, retention of the surfactant in porous media in general also increases. Hence, from an economic standpoint, it is most practical in these special cases to use the lowest equivalent weight sulfonate possible so long as upon equilibration with the oil of interest, the injected aqueous surfactant composition meets the requirements of volumetric uptake defined below.

When chosen by the guidelines outlined above, the standard aqueous surfactant composition will in general be satisfactory for characterizing any oil as disclosed herein. Hence, once the set of standard phase volume diagrams have been constructed wherein the standard aqueous surfactant systems have been equilibrated with known pure hydrocarbons (e.g., see FIG. 7), the test procedure for determining an optimum aqueous surfactant composition is then very quick and simple; (1) evaluate the EACN of the particular crude oil by comparing the characteristic phase volume diagram determined with the crude oil to that of pure hydrocarbon, (2) based on this EACN value, adjust characteristics of surfactant and cosurfactant and optionally salinity relative to the standard in accordance with criteria described herein so as to design an aqueous surfactant composition which will form a multiphase microemulsion system in situ, said microemulsion system possessing characteristics as discussed herein.

In general for purposes of determining the EACN of the crude oil, the temperature of the equilibrated systems containing the crude oil should be the same as that used to determine the phase volume behavior of the standard aqueous composition and the pure hydrocarbons. Once the EACN of the crude oil to be recovered has been determined, adjustments can be made in step 2 above to compensate for the effect of differences in the standard temperature and the actual reservoir temperature. Typically, increasing the temperature of the system has the same effect as (1) decreasing the equivalent weight of the surfactant, (2) increasing the water-solubility of the cosurfactant, or (3) decreasing the salinity of the brine.

Figure 5:
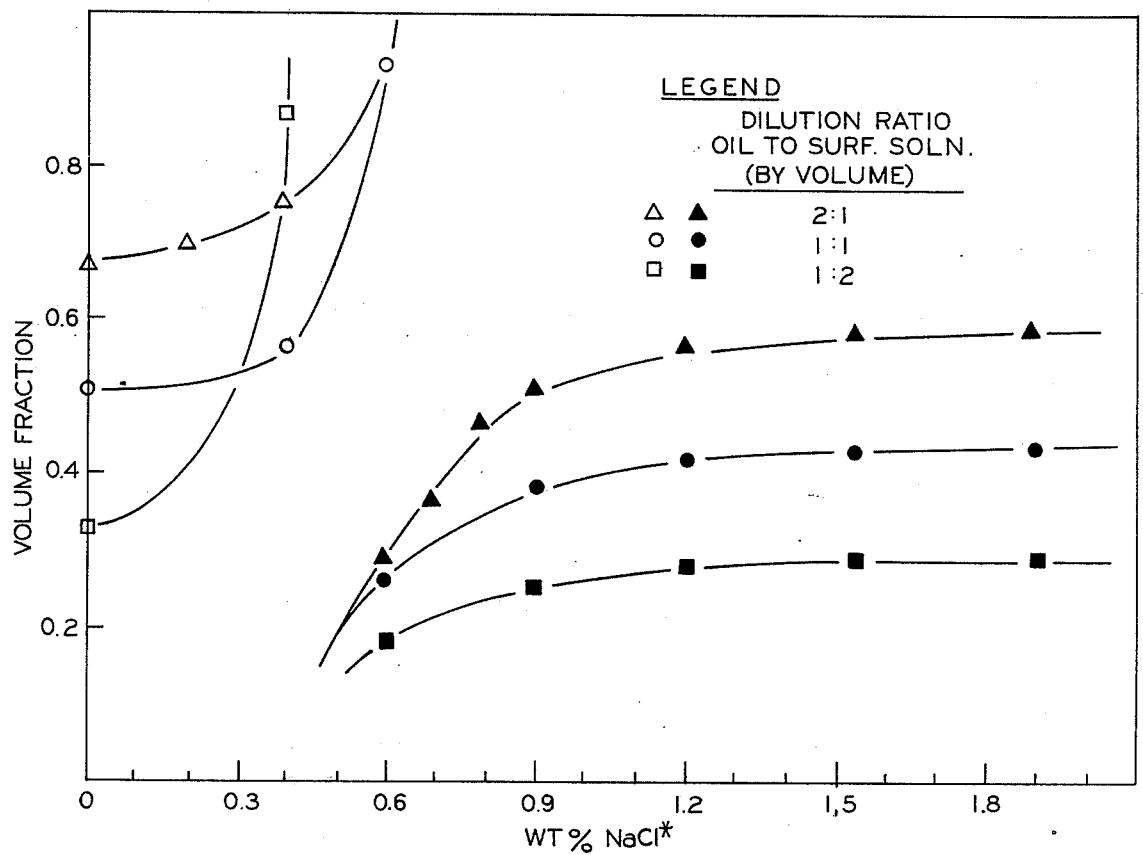
FIG. 5 is a phase volume diagram similar to FIG. 3 wherein the equilibration was carried out using different ratios of oil to surfactant solution.

When a system is achieved wherein three-phase behavior occurs over a narrow range of salinity, an optimum system has been achieved which will give high recovery of oil with reduced loss of sulfonate and which is relatively unaffected by the ratio of oil to water as shown in FIG. 5 which shows similar phase volume relationships with varying dilution ratios in a system optimized to give a three-phase region over a narrow range of salinity. This is essential because as a practical matter the system will become diluted in the formation and thus a system which is relatively independent of dilution effects is highly desirable.

Suitable surfactants for application can include cationic, nonionic and anionic in character.

Preferred surfactants include anionic surfactants, more preferably a synthetic or petroleum sulfonate having an average equivalent weight within the range of 375 to 500. These sulfonates are well known in the art and are sometimes referred to as alkyl aryl sulfonates. They are also sometimes referred to as petroleum sulfonates. They may be a complex mixture of components including aryl sulfonates and alkaryl sulfonates with the mixture consisting mostly of monosulfonates having one $-SO_3Na$ (or $-K$ or $-NH_4$) group per molecule. These individual hydrocarbon sulfonates, for example, can include the following compounds: the ammonium, sodium or potassium dodecylbenzene sulfonates ($C_{18}H_{29}SO_3M$); alkanesulfonates such as octadecane sulfonate ($C_{18}H_{29}SO_3M$); and phenylalkane sulfonates such as phenyldodecane sulfonate ($C_{18}H_{29}SO_3M$). As used herein, the term "equivalent weight" is used in the usual manner and in the case of pure monosulfonates, the equivalent weight equals the molecular weight whereas the equivalent weight of disulfonates is equal to one-half the molecular weight. The equivalent weights referred to are, as noted, average equivalent weights and there may be present significant amounts of sulfonates having an equivalent weight as low as 200 and as high as 650. While synthetic or petroleum sulfonates are preferred, other suitable surfactants include sulfates of polyoxalkylated alcohols such as the Neodol's and Tergitol's, ethoxylated phenols, aminocarboxylates such as sodium N-lauroylsarcosinate, alkyl sulfates such as sodium lauryl sulfate and phosphate esters such as Di(2-ethylhexyl)phosphate. The surfactant is used in an amount within the range of 1 to 7, preferably 2 to 5 weight percent active ingredient based on the weight of water.

The equivalent weight of the surfactant to be used is, of course, dictated by the requirements of the particular oil to be recovered, the cosurfactant used and the salinity in accordance with the criteria set out hereinabove. In general, the lowest equivalent weight surfactant which will yield an in situ formed multiphase microemulsion having characteristics as described herein is preferred.

The cosurfactant can be any alcohol, amide, amine, ester, aldehyde or ketone containing 1–20 carbon atoms and preferably having a solubility in water within the range of 0.5 to 20, more preferably 2 to 10, grams per 100 grams of water at 20° C. Preferred materials are the $C_4$ to $C_7$ alkanols or mixtures thereof. Most preferred are C$_4$ and C$_5$ alcohols having a solubility within the above range. Isobutyl alcohol with a solubility of 9.5 grams per 100 grams of water is particularly suitable. Other preferred cosurfactants include secondary butyl alcohol, n-butyl, n-amyl and isoamyl alcohol. When used, the cosurfactant is utilized in an amount within the range of about 1 to 7, preferably 1.5 to 4 weight percent based on the weight of water.

In general, any combination of surfactants and cosurfactants which meet the criteria as described herein are considered within the scope of this invention.

The brine constitutes in excess of 85 weight percent of the total injected composition and is made up of water and inorganic salts. Suitable inorganic salts in a brine include sodium sulfate, sodium nitrate, sodium chloride, sodium tripolyphosphate (Na$_5$P$_3$O$_{10}$), sodium carbonate, etc., but the monovalent metallic salts, particularly sodium chloride, are preferred. Preferably, inorganic salts are present in the water in an amount within the range of 250, to 100,000, more preferably 500 to 40,000, most preferably 5,000 to 25,000 parts per million total dissolved solids (TDS). Other electrolytes which may be present in combination with the sodium chloride include potassium chloride, calcium chloride, magnesium chloride, sodium sulfate, ammonium chloride, and the like. Large amounts of polyvalent, in particular divalent ions, are undesirable. If divalent ions are present in relatively large amounts, surfactant and cosurfactants as described above which are particularly suited for high tolerance to polyvalent ions may be used (e.g., the sulfates of polyoxyalkylated alcohols).

The injected surfactant solutions should preferably be phase stable, that is, they should be macroscopically homogeneous. Such stability is desirable for convenience in storage and handling and stability at temperatures of the oil formation is particularly desirable.

The optimized aqueous surfactant system of this invention is injected into an injection well or wells in a manner well known in the art in waterflooding operations. On contacting the oil and brine in the formation, a three-phase system is formed in situ comprising (1) a phase containing predominantly said reservoir oil and a small amount of said cosurfactant, (2) a microemulsion phase comprising (a) oil taken up from said reservoir and (b) brine, surfactant and cosurfactant from said injected surfactant system, said microemulsion phase having optimum characteristics as discussed herein by appropriately designing the injected aqueous surfactant composition, and (3) a third phase comprising the majority of said brine from said injected surfactant system, a portion of said cosurfactant from said injected surfactant system and a minor portion of said surfactant from said injected surfactant system. In the actual formation, the variations in structure are such that the multiple phases are commingled and may manifest themselves on a microscopic level, i.e., within individual pore structures.

It will be noted that in the equilibration test procedure used to optimize aqueous surfactantflood systems as disclosed herein, the aqueous surfactant compositions are equilibrated with the oil of interest. This test yields an evaluation of the characteristic phases which are expected to form in situ as the injected aqueous composition contacts oil. In the reservoir the aqueous composition contacts both formation oil and brine. However, as will be shown in subsequent examples, the characteristic behavior which is used to define optimum aqueous surfactant systems is relatively independent of the oil to brine ratio and hence the test procedure disclosed herein for determining the optimum aqueous surfactant system proves satisfactory.

Preferably a mobility buffer is injected behind the surfactant system. Examples of useful mobility buffers include aqueous and nonaqueous fluids containing mobility-reducing agents such as high molecular weight, partially hydrolyzed polyacrylamides, polysaccharides, soluble cellulose ethers, and the like. Preferably, the polyacrylamides are substantially linear homopolymers and copolymers of acrylamide and methacrylamide and can have up to about 75 percent and preferably up to about 45 percent of carboxamide groups hydrolyzed to carboxyl groups. Polyacrylamides are well konwn in the art and can be obtained commercially, typical examples of which are: Dow Pusher 700 and Dow Pusher 1000 marketed by Dow Chemical Company, Midland, Mich., and Betz Hi-Vis sold by Betz Laboratories, Inc., Trevose, Pa. Polysaccharides are also well known in the art and include the ionic heteropolysaccharides produced by fermentation of carbohydrates by bacteria of the genus Xanthomonas. The polysaccharides are commercially available and typical examples of polysaccharides include: Kelzan and Kelzan MF sold by Kelco Company, Los Angeles, Calif. Carboxymethylcellulose is also well known in the art and is commercially available, typical examples of which are: CMC-7, CMC-9 and CMC-12 wherein 7, 9 and 12 refer to a degree of substitution of 0.7, 0.9 and 1.2, respectively. The different grades of CMC are marketed by Drilling Specialties Co., Bartlesville, Okla. 74004. The mobility buffer comprises 50 to 20,000, preferably 200 to 5,000 parts per million of said mobility reducing agent in said fluid. The mobility buffer can be graded, that is, its concentration can be relatively high at the leading edge and relatively low at the trailing edge. For instance, the mobility buffer can start at 2500 ppm and end at 250 ppm. These mobility buffers are known in the art. The mobility buffer is injected in an amount within the range of about 0.001 to 1.0, preferably 0.01 to 0.25 pore volume, based on the pore volume of the total formation.

Finally, a drive fluid is injected behind the mobility buffer to force oil contained in the reservoir toward a recovery well. The drive material can be aqueous or nonaqueous and can be liquid, gas or a combination of the two. Generally, it is formation water or water similar thereto. When a hard brine is the drive liquid, it can be beneficial to precede the brine with a slug of relatively fresh water. The drive fluid is simply injected until all feasible recovery of the oil has been made.

If the optimum system as defined herein corresponds to a system having a salinity considerably different from that of the formation, the injected surfactant system is generally preceded by a preflush using a brine having a salt concentration similar to that required for the surfactant system.

In some cases where the resident brine in the oil reservoir is not highly saline (less than 50,000 ppm total dissolved solids), it is possible to adjust the characteristic of the surfactant and/or the cosurfactant such that the optimum aqueous composition corresponds to a salinity substantially the same as the resident brine. This avoids the need for a preflush.

The preflush, if employed, will generally be utilized in an amount within the range of 0.01 to 2.0, preferably 0.25 to 1 pore volume, based on the pore volume of the total formation being treated. The surfactant system is injected in an amount within the range of about 0.001 to 1.0, preferably 0.01 to 0.25, pore volume based on the pore volume of the total formation being treated.

Equilibration of a hydrocarbon such as a crude oil with a substantially equal volume of a dilute aqueous surfactant system as outlined herein above and containing progressively higher salt concentrations can typically give rise to the following types of phase behavior:

(a) Region I: Two Phases (Relatively Low Salinity): The equilibration of the aqueous surfactant system and oil results in an upper phase consisting predominantly of oil and a water-rich lower phase microemulsion comprising water, surfactant, oil and cosurfactant.

$V_s/V_o$ is $< 1.0$, preferably $< 0.5$ and $V_s/V_w$ is $< 1.0$, preferably $< 0.5$. Suitable parameters for surfactant systems exhibiting two-phase behavior which are also effective in tertiary oil recovery are also shown. That is, these relationships go in pairs. If $V_o/V_w$ is less than 1 in the microemulsion phase, i.e., an excess of water, this is on the low salinity side of optimum and it is the $V_s/V_o$ ratio which must be within the ranges stated below. If $V_o/V_w$ is greater than 1 in the microemulsion phase, i.e., an excess of oil, this is on the high salinity side of optimum and it is the $V_s/V_w$ ratio which must be within the ranges stated. At $V_o/V_w$ equal to 1, $V_s/V_o$ and $V_s/V_w$ are, of course, equal.

|  | $V_o/V_w$ | | $V_s/V_o(V_o<V_w)$ | | | |
|---|---|---|---|---|---|---|
|  | Broad | Preferred | Broad | Preferred | | |
| Region I (Two Phases) | $>0.05$ | $>0.2$ | $<1.5$ | $<0.5$ | | |
|  | $V_o/V_w$ | | $V_s/V_o(V_o<V_w)$ | | $V_s/V_w(V_o>V_w)$ | |
|  | Broad | Preferred | Broad | Preferred | Broad | Preferred |
| Region II (Three Phases) | 0.1 to 10 (Ideally 1:1) | 0.5 to 5.0 | $<1.0$ | $<0.5$ | $<1.0$ | $<0.5$ |
|  | $V_w/V_o$ | | $V_s/V_w(V_o>V_w)$ | | | |
|  | Broad | Preferred | Broad | Preferred | | |
| Region III (Two Phases) | $>0.05$ | $>0.2$ | $<1.5$ | $<0.5$ | | |

(b) Region II: Three Phases (Intermediate Salinity): The equilibration of the surfactant system and oil results in an upper phase consisting predominantly of oil, a middle phase microemulsion comprising water, oil, surfactant and cosurfactant and a bottom phase comprising predominantly water.

(c) Region III: Two Phases (Relatively High Salinity): The equilibration of the surfactant system and oil results in an oil-rich upper phase microemulsion comprising water, oil, surfactant and cosurfactant and a lower phase comprising predominantly water.

The above types of phase behavior resulting from the equilibration of surfactant systems with oil can alternately be described in tabular form as shown below:

It will be noted hereinbelow that the preferred systems which exhibit two-phase behavior as described above are those which are very near to the three region, wherein the three-phase region exist over a relatively narrow salinity range.

The above parameters can be correlated with phase-volume diagrams which can be constructed on the basis of data resulting from equilibration of oil with aqueous surfactant systems containing different salt concentrations as described more completely in Example I. Through the use of the comparisons of the crude oil from a reservoir to be flooded with the standard mixtures as set out hereinabove and as will be illustrated in more detail hereinbelow, it is easy to design optimum aqueous surfactant systems, said systems being effective

TABLE I

| Phase Behavior in Equilibrated Mixtures of Oil and Saline Surfactant Systems | | | |
|---|---|---|---|
|  | Region I Relatively Low Salinity | Region II Intermediate Salinity | Region III Relatively High Salinity |
| No. of Phases: | Two | Three | Two |
| Upper Phase: | Predominantly Oil | Predominantly Oil | Oil-Rich Microemulsion |
| Middle Phase: | None | Microemulsion comprising water, oil, surfactant and co-surfactant | None |
| Bottom Phase: | Water-Rich Microemulsion | Predominantly Water | Predominantly Water |

In accordance with the present invention, the most effective aqueous surfactant system of recovery of oil from porous media are those which upon equilibration of said aqueous surfactant systems with substantial equal volumes of the oil of interest form a multiphase microemulsion system, said microemulsion phase having the following relative volumes of oil ($V_o$) water ($V_w$) and surfactant + optionally cosurfactant ($V_s$).

The following ranges are suitable parameters for selecting the best surfactant system in view of said phase behavior at different salt concentrations. The optimal system for oil recovery being characterized by three-phase behavior wherein ideally $V_o = V_w$ and in forming an effective multiphase microemulsion system for maximized oil recovery efficiency.

EXAMPLE I

Equilibration of 24 ml of n-decane with 26 ml of a surfactant system comprising 24 ml of brine, 1 ml of surfactant and 1 ml of cosurfactant gave the phase behavior depicted in FIG. 1. Twelve surfactant systems were used with the indicated salinities expressed as weight percent NaCl. The cosurfactant was isobutyl alcohol and the surfactant was Witco Chemical Co.

TRS 10-410 (sodium petroleum sulfonate average equivalent weight 418). The equilibrations were carried out in 50 ml glass-stoppered graduated cylinders which were shaken and then incubated in a temperature bath at 86° F. (30° C.) until volumetric readings remained constant with time (24 hour periods). The volumes of the various phases at equilibrium were recorded as shown in FIG. 1 and Table II.

Referring to FIG. 1 the following features are to be noted:

(a) Two phases were formed at 0.5000 and 1.000 weight percent NaCl. The upper phase was predominantly oil and the lower phase was a water-rich microemulsion.

(b) Three phases were formed over the salinity range of 1.0156 to 1.3125 weight percent NaCl. The upper phase was predominantly oil, the middle phase was a microemulsion comprising water, oil, surfactant and cosurfactant whereas the bottom phase was predominantly water.

(c) Two phases were formed at salinities in excess of 1.375 weight percent NaCl. The upper phase was an oil-rich microemulsion and the lower phase was predominantly water.

(d) The $V_o$ values in FIG. 1 were computed by subtracting the volume of the oil phase from the 24 ml of oil used in the equilibration.

(e) The $V_s$ value was 2.0 based on the assumption that the total volume of surfactant and cosurfactant was present in the microemulsion phase which is a good approximation.

(f) The $V_w$ values in FIG. 1 were computed by subtracting the $(V_o + V_s)$ sum from the observed volume of the microemulsion $V\mu$.

By using the data of Table II based on the equilibration results of FIG. 1, a phase-volume diagram was constructed. The volume fractions listed in Table II were plotted versus the salinities of the surfactant systems. For purposes of this disclosure (see FIG. 2), Region I (relatively low salinity) is referred to as the two-phase gamma region; Region II (intermediate salinity) is referred to as the three-phase beta region; and Region III (relatively high salinity) is referred to as the two-phase alpha region. Referring to FIG. 1 for the specific surfactant system under consideration, it can be seen that the two-phase gamma region exists up to about one weight percent NaCl, the three-phase beta region exists over the range of about one weight percent NaCl to about 1.350 weight percent NaCl, and the two-phase alpha region exists at salinities greater than about 1.350 weight percent NaCl.

The parameters $V_o/V_w$, $V_s/V_w$, $V_s/V_o$ and $V_w/V_o$ can be calculated from the specific phase behavior at the salinities of FIG. 1 or approximated from the phase-volume diagram of FIG. 2. For example, in the three-phase beta region corresponding to the equilibration of an oil with surfactant systems of 1.1250 and 1.100 weight percent NaCl, the parameters are computed, respectively, as shown below.

(a) Based on data of FIG. 1 (1.1250 wt. % NaCl)

$V_o = 10.6\ (24-13.4)$   $V_s = 2.0$   $V_w = 9.0$
$[21.6 - (2 + 10.6)]$ $V_o/V_w = 1.178\ (V_o > V_w)$, and $V_s/V_w = 0.222$ Since the values $V_o/V_w$ and $V_s/V_w$ are in the preferred range cited above, the surfactant system would effectively displace substantially all of the residual oil in a tertiary oil recovery process at a resident brine concentration in the range of 1.1250 weight percent NaCl.

(b) Based on the phase-volume diagram of FIG. 2 (1.100 wt. % NaCl)

|  |  | Volume Fractions | Volumes (ml) |
|---|---|---|---|
| (i) | Top Phase | 0.28 × 50 = | 14.0 |
| (ii) | Middle Phase | 0.44 (0.72 − 0.28) × 50 = | 22.0 |
| (iii) | Bottom Phase | 0.28 (1.00 − 0.72) × 50 = | 14.0 |
| $V_o = 10.0\ (24 - 14)$ | | $V_s = 2.0$   $V_w = 10.0\ [22 - (10 + 2)]$ | |
| $V_o/V_w = 1.0$ | | $V_s/V_w = V_s/V_o = 0.2$ | |

Since $V_o/V_w = 1.0$ at 1.100 weight percent NaCl and $V_s/V_w = V_s/V_o = 0.2$ are in the preferred range for these parameters, the surfactant system would displace substantially all the residual oil in a tertiary oil recovery process in a resident brine in said salinity range.

The parameters $V_o/V_w$, $V_s/V_w$, and $V_s/V_o$ can similarly be calculated for the two-phase gamma region and the two-phase alpha region from FIG. 1 or FIG. 2. For example, the salinities 0.75 weight percent NaCl and 1.80 weight percent NaCl are considered in view of FIG. 2. The salinities 1.000 and 1.500 are considered in view of FIG. 1.

(a) 0.75 weight percent NaCl (gamma two-phase region)
From FIG. 2:

|  |  | Volume Fractions | Volumes (ml) |
|---|---|---|---|
| (i) | Top Phase | 0.38 × 50 = | 19.0 |
| (ii) | Middle Phase |  | None |
| (iii) | Bottom Phase | 0.62 × 50 = | 31.0 |
| $V_o = 5.0\ (24 - 19)$ | | $V_s = 2.0$ | $V_w = 24.0$ |
| $V_o/V_w = 0.21$ | | $V_s/V_o = 0.4$ | |

(b) 1.80 weight percent NaCl (alpha two-phase region)
From FIG. 2:

|  |  | Volume Fractions | Volumes (ml) |
|---|---|---|---|
| (i) | Top Phase | 0.56 × 50 = | 28 |
| (ii) | Middle phase |  | None |
| (iii) | Bottom Phase | 0.44 × 50 = | 22 |
| $V_o = 24.0$ | | $V_s = 2.0$ | $V_w = 2.0\ [24 - (24 + 2)]$ |
| $V_w/V_o = 0.08$ | | $V_s/V_w = 1.0$ | |

The $V_o/V_w$, $V_s/V_o$, $V_w/V_o$ and $V_s/V_w$ values of (a) and (b) are within the ranges specified above for the invention, the values for (a) further being within the preferred ranges.

(c) 1.000 weight percent NaCl (gamma two-phase region)
From FIG. 1:

$V_o = 8.2\ (24 - 15.8)$   $V_s = 2.0$   $V_w = 24$ $V_o/V_w = 0.342$   $V_s/V_o = 0.244$ (d) 1.500 weight percent NaCl (alpha two-phase region)
From FIG. 1:

$V_o = 24$   $V_s = 2.0$   $V_w = 3.3$ $V_w/V_o = 0.138$   $V_s/V_w = 0.606$

The $V_o/V_w$, $V_s/V_w$, $V_w/V_o$ and $V_s/V_o$ values in (c) and (d) are within the ranges specified above for the invention, the values for (a) further being within the preferred ranges.

TABLE II

| | | | Volume Fraction Values Used in Phase-Volume Diagram (FIG. 2) | | | | | | | |
|---|---|---|---|---|---|---|---|---|---|---|
| System No. | No. Phases | Wt. % NaCl | Volumes of Phases | | | Total Volume | Volume Fractions | | | |
| | | | Top | Middle | Bottom | | Top | Middle | Bottom | (Middle + Bottom) |
| 1 | 2 | 0.500 | 21.6 | None | 28.4 | 50.0 | 0.432 | 0.0 | 0.568 | 0.568 |
| 2 | 2 | 1.000 | 15.8 | None | 34.2 | 50.0 | 0.316 | 0.0 | 0.684 | 0.684 |
| 3 | 3 | 1.0156 | 15.5 | 29.0 | 5.5 | 50.0 | 0.310 | 0.580 | 0.110 | 0.690 |
| 4 | 3 | 1.03125 | 15.5 | 26.1 | 8.4 | 50.0 | 0.310 | 0.522 | 0.168 | 0.690 |
| 5 | 3 | 1.0625 | 15.2 | 23.5 | 11.3 | 50.0 | 0.304 | 0.470 | 0.226 | 0.696 |
| 6 | 3 | 1.125 | 13.4 | 21.6 | 15.0 | 50.0 | 0.268 | 0.432 | 0.300 | 0.732 |
| 7 | 3 | 1.250 | 9.1 | 22.9 | 18.0 | 50.0 | 0.182 | 0.458 | 0.360 | 0.818 |
| 8 | 3 | 1.2812 | 6.8 | 25.0 | 18.2 | 50.0 | 0.136 | 0.500 | 0.364 | 0.864 |
| 9 | 3 | 1.3125 | 7.8 | 23.5 | 18.7 | 50.0 | 0.156 | 0.470 | 0.374 | 0.844 |
| 10 | 2 | 1.375 | 30.8 | None | 19.2 | 50.0 | 0.616 | 0.0 | 0.384 | 0.384 |
| 11 | 2 | 1.500 | 29.3 | None | 20.7 | 50.0 | 0.586 | 0.0 | 0.414 | 0.414 |
| 12 | 2 | 2.000 | 27.6 | None | 22.4 | 50.0 | 0.552 | 0.0 | 0.448 | 0.448 |

EXAMPLE II

This example is presented to demonstrate the following points: (1) In the systems preferred in this invention, changes in the overall surfactant concentration result predominately in changes in the relative volume of the microemulsion phase formed in situ without substantial changes in the concentration of the ingredients in the individual phases (for a given salinity), (2) volume ratios of oil to aqueous surfactant solution substantially different from unity can be effectively used to construct phase volume diagrams as outlined in Example I, (3) the effectiveness of the surfactantflood systems as preferred in this invention is relatively insensitive to dilution effects which are likely to occur as the surfactant slug is propogated through the oil reservoir.

Figure 3:
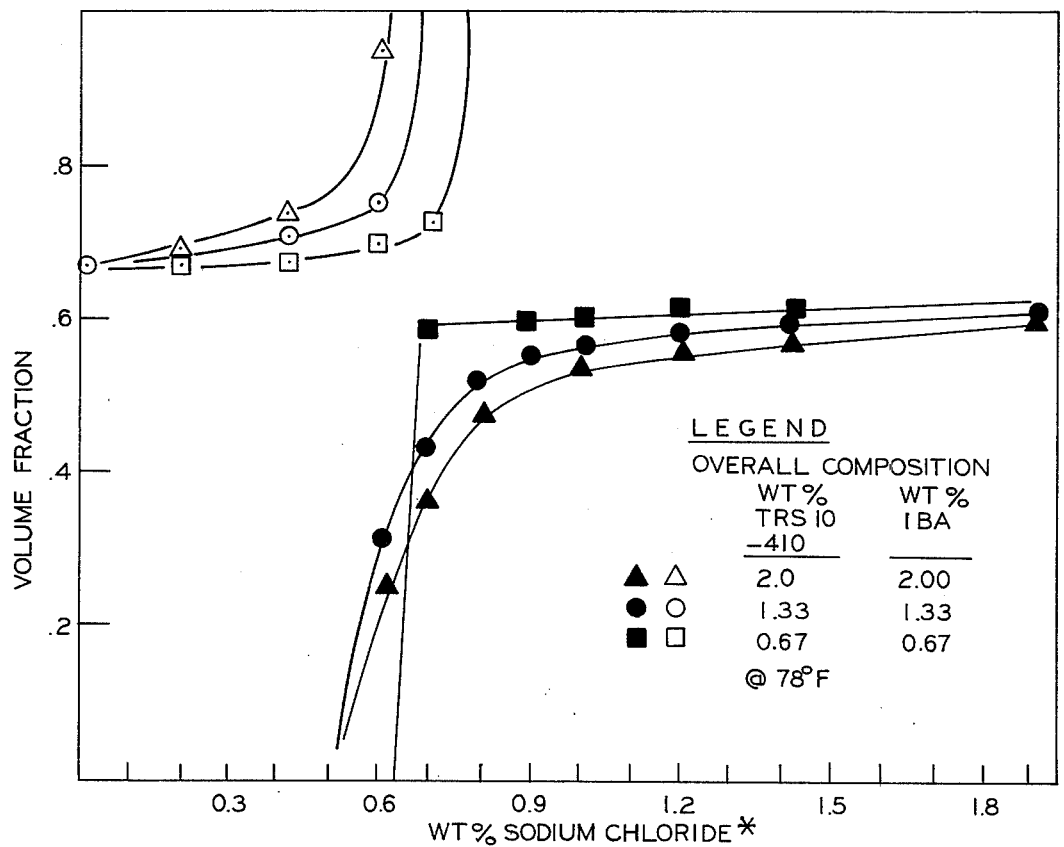
FIG. 3 is a phase volume diagram similar to FIG. 2 showing the effect of varying the concentration of the surfactant.
Figure 4:
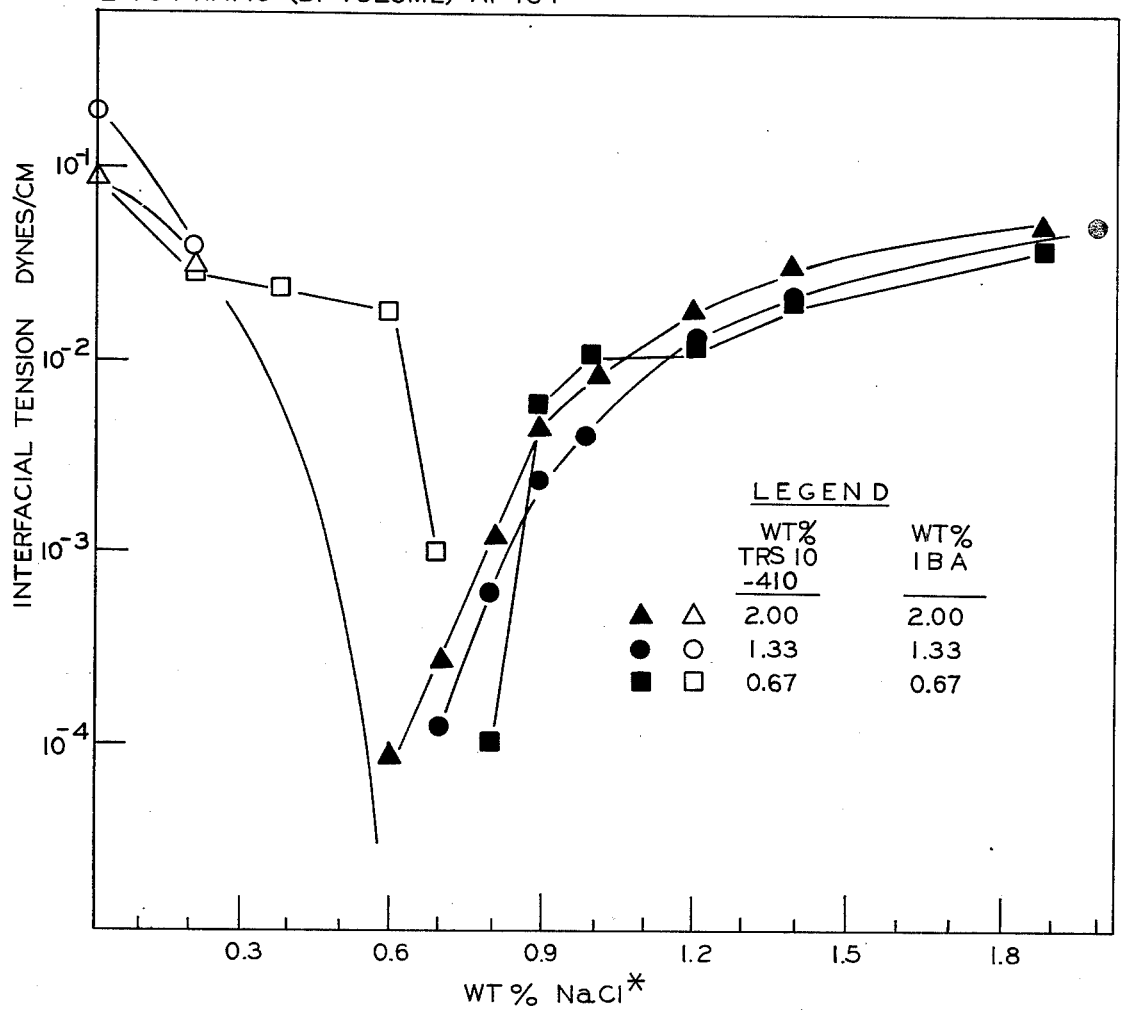
FIG. 4 is a diagram showing the relationship between interfacial tension and salinity at the various surfactant concentrations shown in FIG. 3.

FIG. 3 shows phase volume diagrams constructed as outlined in Example I wherein aqueous surfactant compositions containing varying overall concentrations of active TRS 10–410 and isobutanol were equilibrated against a Cut Bank crude oil at 78° F. Note that the characteristic phases present at given salinity values remain relatively unchanged as the overall surfactant plus cosurfactant concentration is changed. Correspondingly, the interfacial tensions measured between phases are relatively unaffected by this variation in concentration. (See FIG. 4.)

Figure 6:
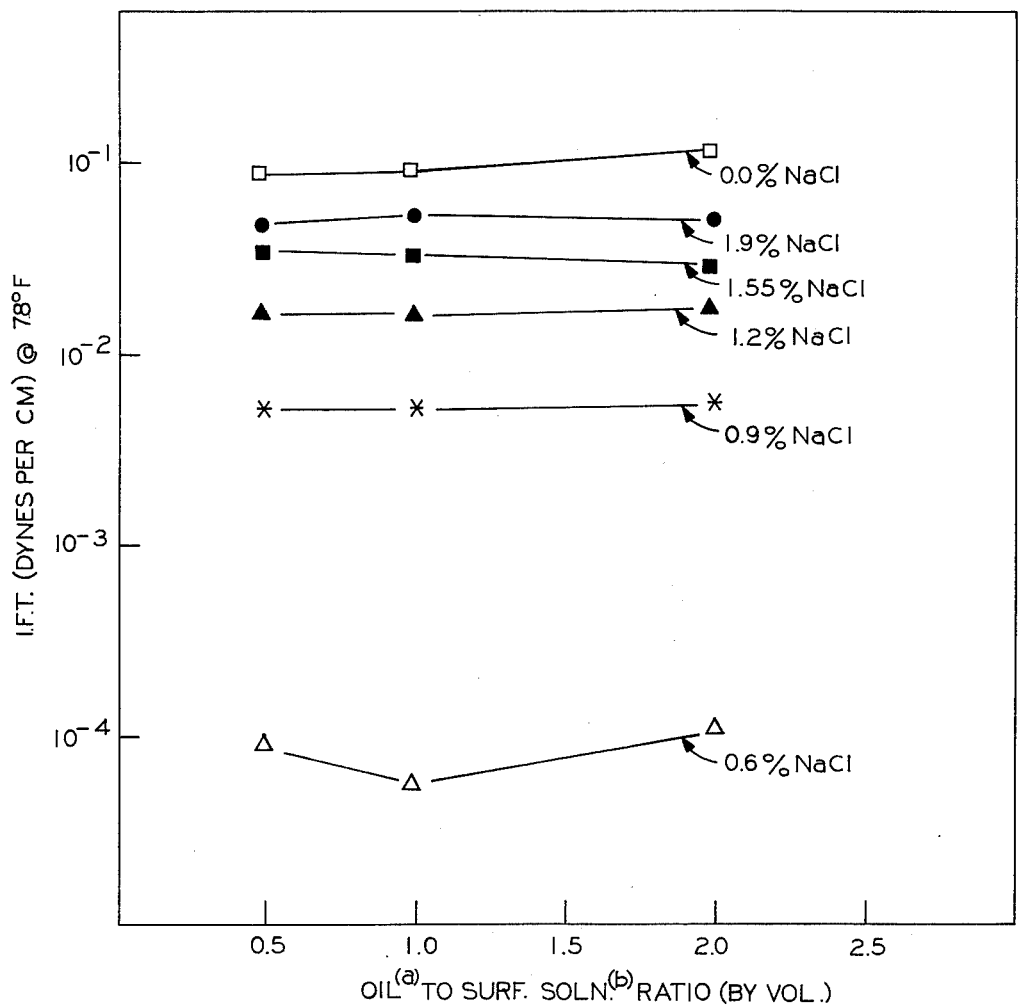
FIG. 6 is a graph showing the relationship between interfacial tension and the oil to surfactant solution ratio at different salinities.

FIG. 5 shows phase volume diagrams constructed as outlined in Example I wherein aqueous surfactant compositions containing 3 percent active TRS 10–410 plus 3 percent isobutanol were diluted by 50, 100 and 200 volume percent with the crude oil, (i.e., oil to surfactant solution ratios of approximately 0.5, 1.0 and 2.0). Note again that the characteristic phase behavior is relatively unchanged as the dilution ratio is varied. Correspondingly, FIG. 6 shows that the interfacial tension between phases at given salinity values are relatively insensitive to variations of the dilution ratio.

EXAMPLE III

This example demonstrates the significance of the characteristics of the oil to be displaced as it relates to the phase behavior as preferred in the present invention. In general, crude oils of interest can be characterized for purposes of the present invention in terms of an "effective alkane carbon number" (EACN). The EACN of a crude oil can be determined by matching the phase behavior obtained upon equilibration of the crude oil with a given surfactant composition as preferred in this invention with a similarly equilibrated system in which pure individual hydrocarbons are used as the "oil".

FIG. 7 shows phase volume diagrams constructed as in Example I wherein various pure hydrocarbons were equilibrated against equal volume surfactant solutions containing 3 weight percent active TRS 10–410 plus 3 weight percent isobutanol at various salinities. Note that as the EACN decreases, (1) the relative volume of the microemulsion phase in the three-phase region increases, and (2) the salinity range over which three phases exist decreases.

Figure 8:
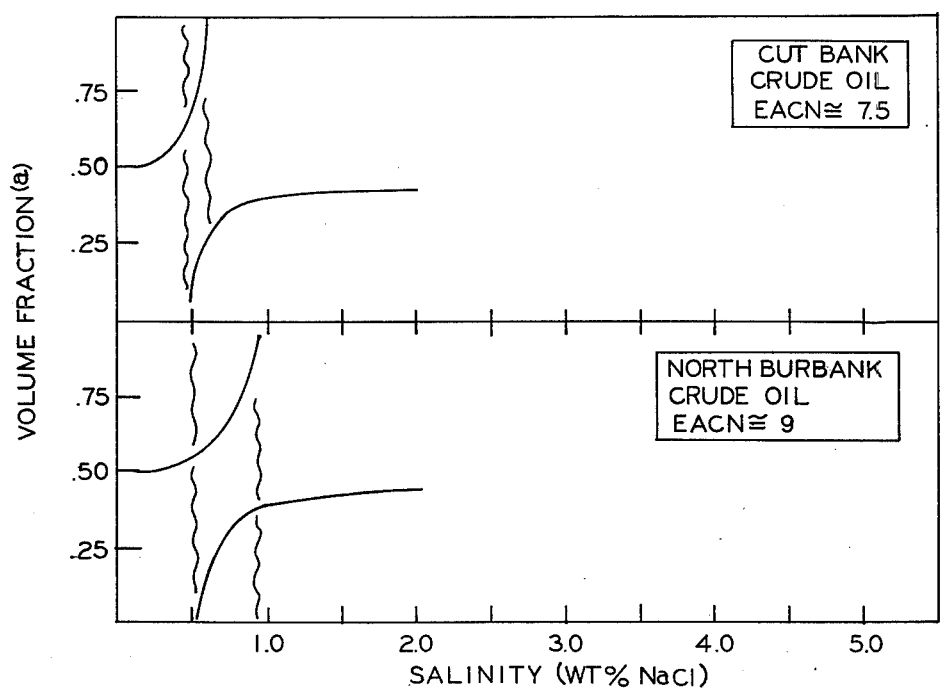
FIG. 8 shows examples of the effect of different crude oils on phase volume behavior.

FIG. 8 shows phase volume diagrams constructed as outlined in Example I for two crude oil samples. By comparing the characteristics of the phase volume diagrams with those obtained with pure hydrocarbons, it was determined that the EACN for Cut Bank and North Burbank crude oil was about 7.5 and 9, respectively.

It is significant to note in accordance with this invention that "live" or simulated "live" crude oil samples should be used in determining the optimum surfactant composition surfactant. Loss of volatile components from the crude oil effectively changes the EACN of the oil. For experimental purposes, a "live" crude oil can generally be simulated by adding to the "dead" crude, hydrocarbon(s) having a low EACN so as to reduce the high EACN value of the "dead" crude to the EACN value under reservoir conditions.

The optimal aqueous surfactant system for oil recovery as noted above and illustrated in Example IV is characterized by in situ formation of a three-phase microemulsion system (beta region) or is characterized by in situ formation of a two-phase microemulsion system immediately outside the three-phase region, i.e., in the alpha two-phase region or gamma two-phase region near the beta region.

EXAMPLE IV

Figure 9:
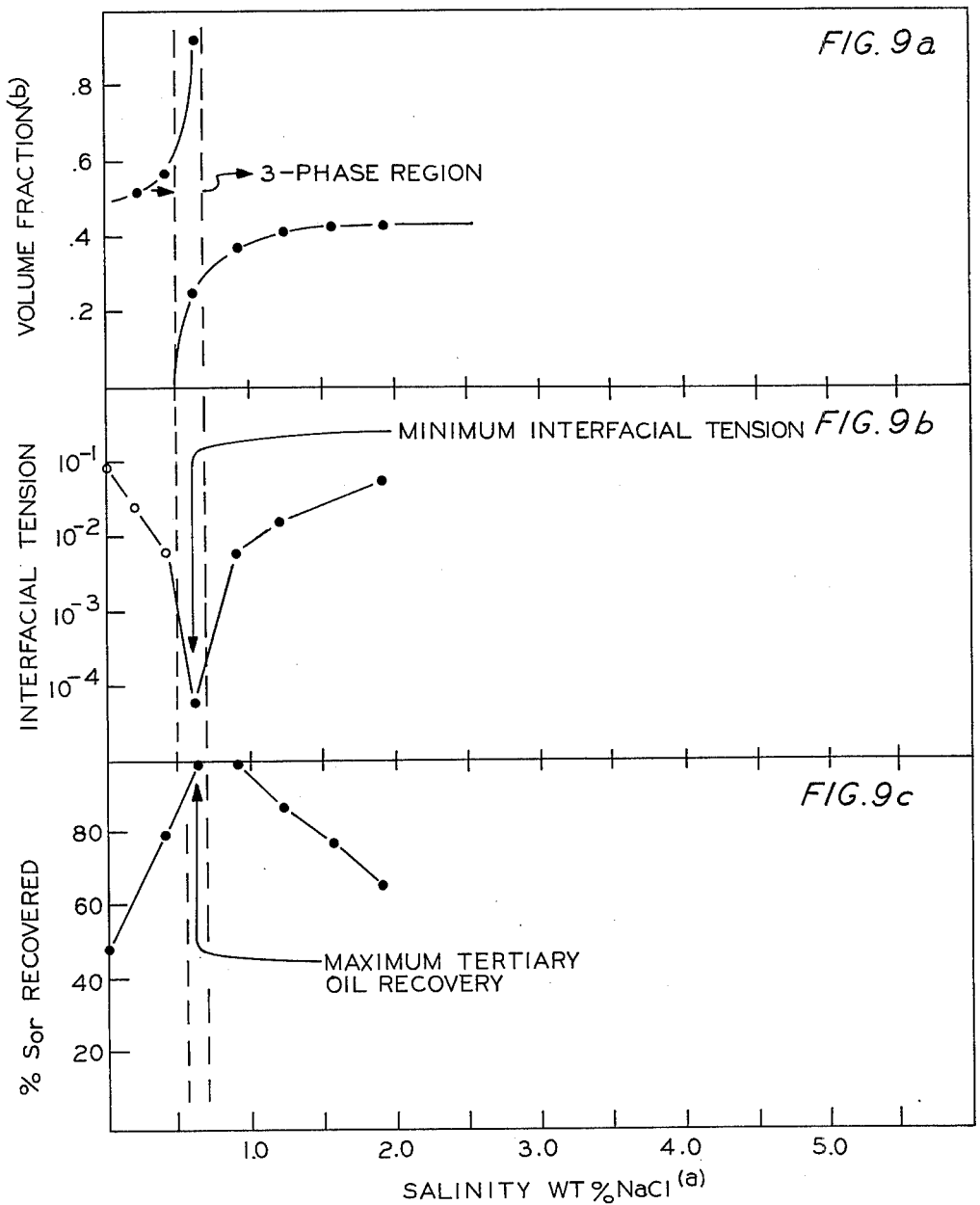
FIGS. 9a, 9b, and 9c show the relationship between the phase volume behavior, interfacial tension and residual oil recovered.

Samples of Cut Bank crude oil were equilibrated with aqueous surfactant compositions (equal volumes) containing 3 weight percent active Witco Chemical Company TRS 10–410 and 3 weight percent isobutyl alcohol cosurfactant at the following salinities (weight percent NaCl): 0.40, 0.60, 0.90, 1.20, 1.55 and 1.9. A phase volume diagram based on these equilibrations was constructed and is shown in FIG. 9a. At each salinity the interfacial tensions (IFT) between the phases present were measured and plotted against the corresponding salinities (see FIG. 9b). A minimum in interfacial tension is to be noted at about 0.6 weight percent NaCl. (See FIG. 9b).

In order to demonstrate that maximum tertiary oil recovery results when the surfactant composition is chosen in accordance with the present invention, displacement tests were conducted using the corresponding aqueous surfactant compositions at various salinities in Berea sandstone cores containing waterflood residual Cut Bank crude oil in order to obtain comparative residual oil recovery data corresponding to the salinities used above in plotting the phase-volume diagram. The results of these oil displacement tests are also plotted as a function of salinity in FIG. 9c and illustrate that maxigraded back logarithmically in polymer concentration.

The surfactantflood sequence was conducted at a frontal velocity of 0.6 foot per day with the cores in a horizontal position. The cores were rotated continuously 2.4 revolutions per hour to reduce gravity segregation effects.

Pertinent experimental data for the oil displacement tests are summarized in Table III.

TABLE III

Results of Oil Displacement Tests
Conducted in 3-foot Long Water-Wet Berea Cores

| Run No. | 1 | 2 | 3 | 4 | 5 | 6 | 7 |
|---|---|---|---|---|---|---|---|
| Salinity (wt. %NaCl)** | 0.00 | 0.40 | 0.60 | 0.90 | 1.20 | 1.55 | 1.9 |
| Core Pore Volume (cc) | 808 | 805 | 732 | 786 | 776 | 808 | 853 |
| Initial Oil Saturation, $S_{oi}$ (%) | 65.3 | 65.2 | 65.6 | 65.8 | 66.5 | 65.7 | 64.0 |
| Residual Oil Saturation, $S_{or}$ (%) | 38.8 | 37.9 | 37.7 | 38.3 | 37.4 | 38.6 | 36.1 |
| Specific Perm. to Brine (md) | 485 | 412 | 490 | 378 | 575 | 510 | 629 |
| Brine Perm. at $S_{or}$ (md) | 24 | 16 | 26 | 16 | 32 | 26 | 36 |
| Tertiary Oil Recovery(% $S_{or}$) | 48.8 | 79.3 | 99.9 | 98.7 | 86.9 | 78.0 | 64.9 |
| Total Oil Recovery (% $S_{oi}$) | 69.5 | 88.0 | 99.9 | 99.3 | 92.4 | 87.1 | 80.2 |
| Final Avg. Oil Saturation (% PV) | 19.9 | 7.8 | 0.0 | 0.5 | 5.1 | 8.6 | 12.7 |
| Maximumm AVg. Press. Gradient (psi/ft) | 6.8* | 7.2* | 0.8 | 0.9 | 0.6 | 0.8 | 1.0 |

*Relatively greater pressure gradients were observed in these two tests because of permeability damage due to the relatively fresh water. Pressure increase was observed at the onset of injection of preflush.
**Prepared in base brine containing 607 total dissolved solids (TDS).

mum oil recoveries occurred at salinities corresponding to the three-phase region or corresponding to regions immediately outside that region, e.g., the recoveries, respectively, at 0.4 and 0.9 weight percent NaCl were 79.3% and 98.7%, whereas recovery was 99.9% at 0.6 weight percent NaCl. Using the phase volume diagram (see FIG. 9a), it is obvious that the values of $V_o/V_w$, $V_s/V_w$ for these salinities are within the broad ranges outlined above for practicing the instant invention. It is to be noted that the 0.4 weight percent salinity is in the gamma two-phase region. $V_o/V_w$ and $V_s/V_o$ are 0.12 and 0.54, respectively, at a salinity of 0.4 weight percent NaCl which is within the broad range but not the preferred range. $V_o/V_w$ and $V_s/V_w$ are 2.0 and 0.14 at 0.6 weight percent NaCl which is with the preferred range. $V_w/V_o$ and $V_s/V_w$ are 0.20 and 0.31 at 0.90 weight percent NaCl, which again is in the preferred range. The maximum tertiary oil recovery with an aqueous surfactant composition is coincident with approximately the "middle" of the preferably narrow beta three-phase region and the minimum in the interfacial tension values.

All of the oil displacement tests were conducted in 3-foot long (3-inch diameter) Berea sandstone cores at 78° F. In each displacement test, the cores were brought to a state of waterflood residual oil using conventional procedures. The cores were (1) saturated with brine at the salinity of interest, (2) flooded with oil (Cut Bank crude) to an irreducible water saturation (connate water saturation), (3) flooded with water to an irreducible oil saturation (waterflood residual). The slug compositions and sequence for the tests were as follows:

(i) 0.4 PV Preslug: 0.4 weight percent $Na_5P_3O_{10}$ with 0.1 weight percent $Na_2CO_3$ prepared in a brine containing the desired salinity.

(ii) 0.10 PV Surfactant System Slug: 3 weight percent active Witco Chemical Company TRS 10–410, 3 weight percent isobutyl alcohol, 0.4 weight percent $Na_5P_3O_{10}$, 0.1 weight percent $Na_2CO_3$ prepared in a brine containing the desired salinity.

(iii) 0.50 PV Mobility Buffer: 1700–2500 ppm Betz Hi-Vis polyacrylamide prepared in a brine containing the desired salinity. The mobility buffer was

EXAMPLE V

In this example, results of oil displacement tests conducted in a manner similar to those discussed in Example IV are given wherein other "oils" having different EACN's (as defined in Example III) were displaced from Berea sandstone cores. The results show that as the EACN of the oil is varied, maximum tertiary oil recovery varies consistent with the preferred phase behavior wherein the values of $V_o/V_s$ and $V_w/V_s$ are relatively large and $V_o/V_w$ approaches unity as disclosed above. The results also demonstrate the significance of oil type in designing an effective surfactantflood process as was suggested by the results in Example III.

Figure 10:
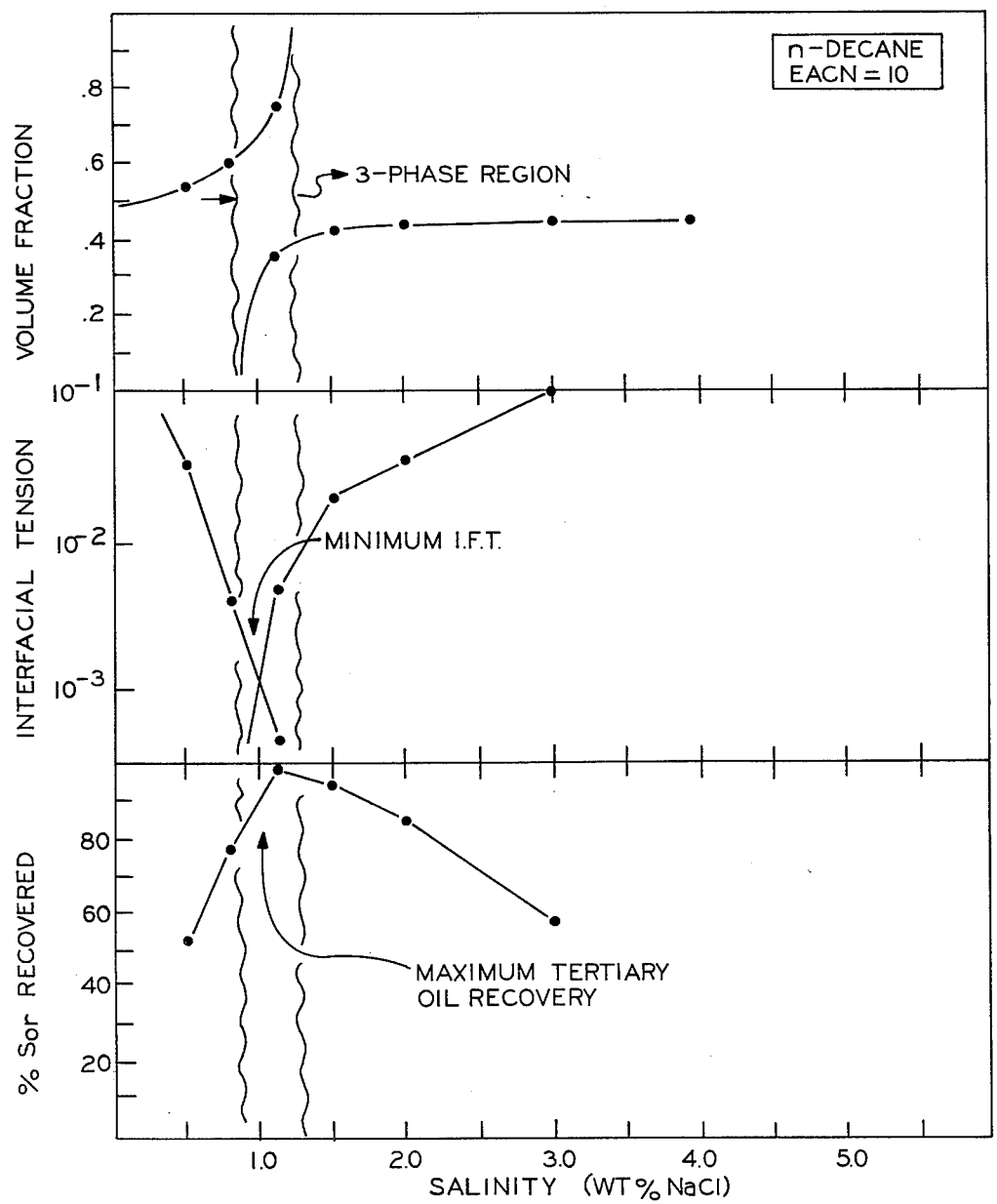
FIG. 10 shows the relationship between phase volume behavior, interfacial tension and oil recovery.
Figure 11:
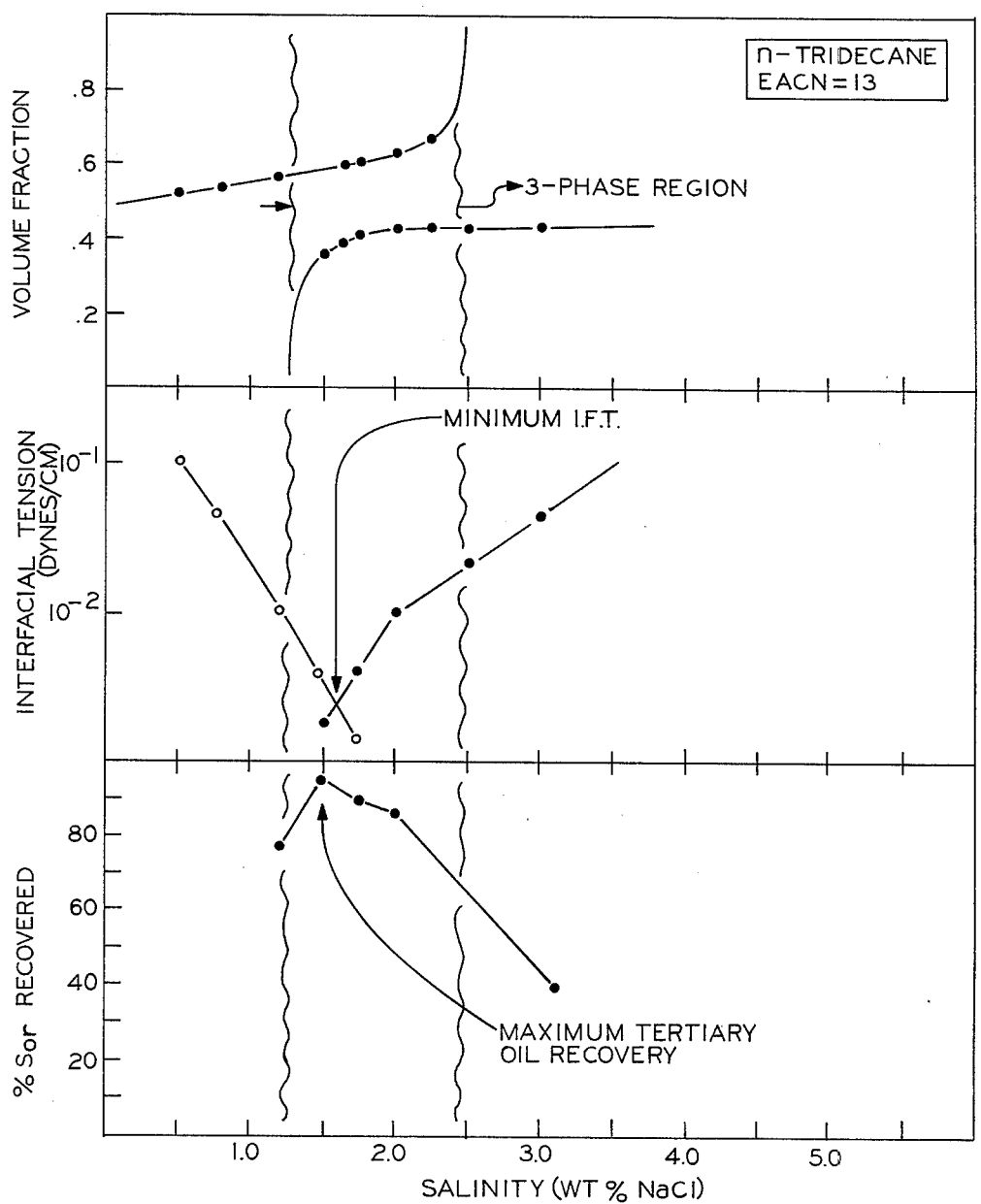
FIG. 11 shows the relationship between phase volume behavior, interfacial tension and oil recovery in a system having a broader salinity over which three-phase partitioning occurs.
Figure 12:
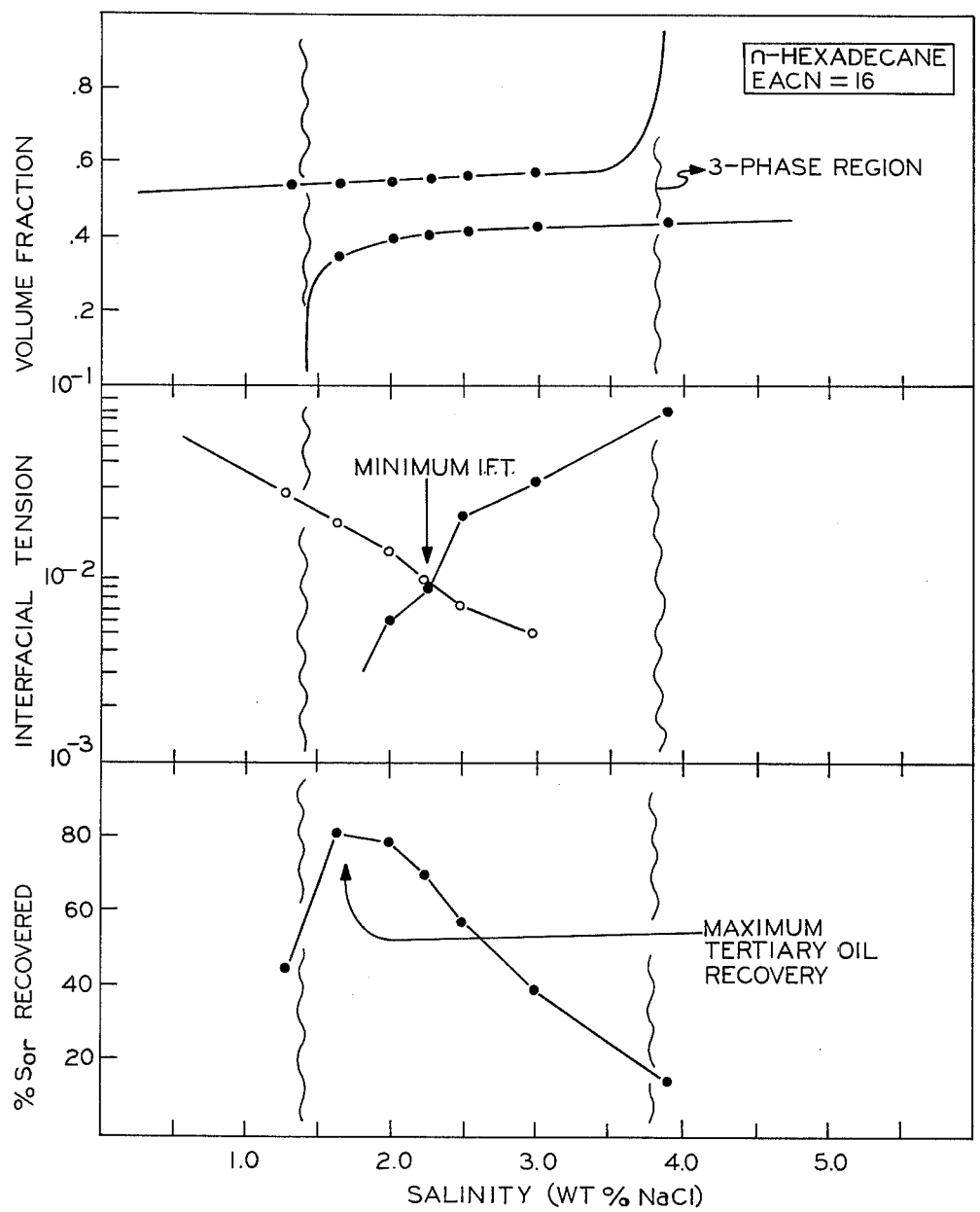
FIG. 12 shows the relationship between phase volume behavior, interfacial tension and oil recovery in a system having an even broader range of salinity over which three-phase behavior occurs.

FIGS. 10, 11 and 12 show correlations of phase volume and interfacial tension behavior with tertiary oil recovery at various salinities for displacement of various oils having EACN's as determined by the procedure outlined in Example III. The corresponding interfacial tensions were measured between the various phases formed in the equilibration tests used to construct the phase volume diagrams. In the oil displacement tests, the cores were reduced to a residual oil saturation as outlined in Example IV. In all of the tests, 10% pore volume slugs containing 3 weight percent active TRS 10–410 plus 3 weight percent isobutanol were used. Pertinent experimental data for the oil displacement tests are given in Tables IV, V and VI.

Note that as the EACN of the oil is varied, maximum oil recovery is consistently shifted to salinity values corresponding to the preferable three-phase region wherein the volume ratios are optimized as discussed in Example I.

Figure 13:
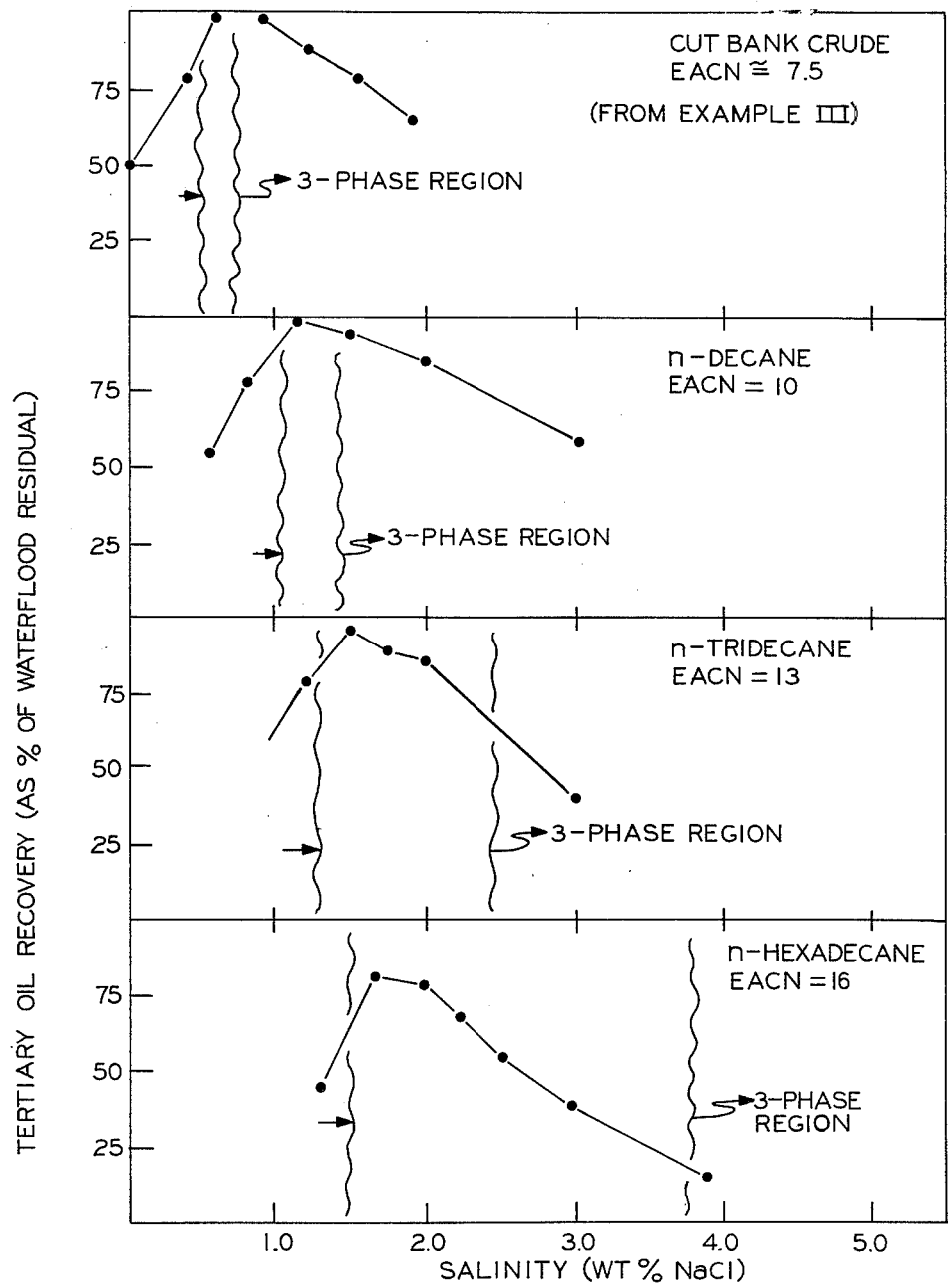
FIG. 13 compares oil recovery with the breadth of the salinity range over which three-phase partitioning occurs.
Figure 14:
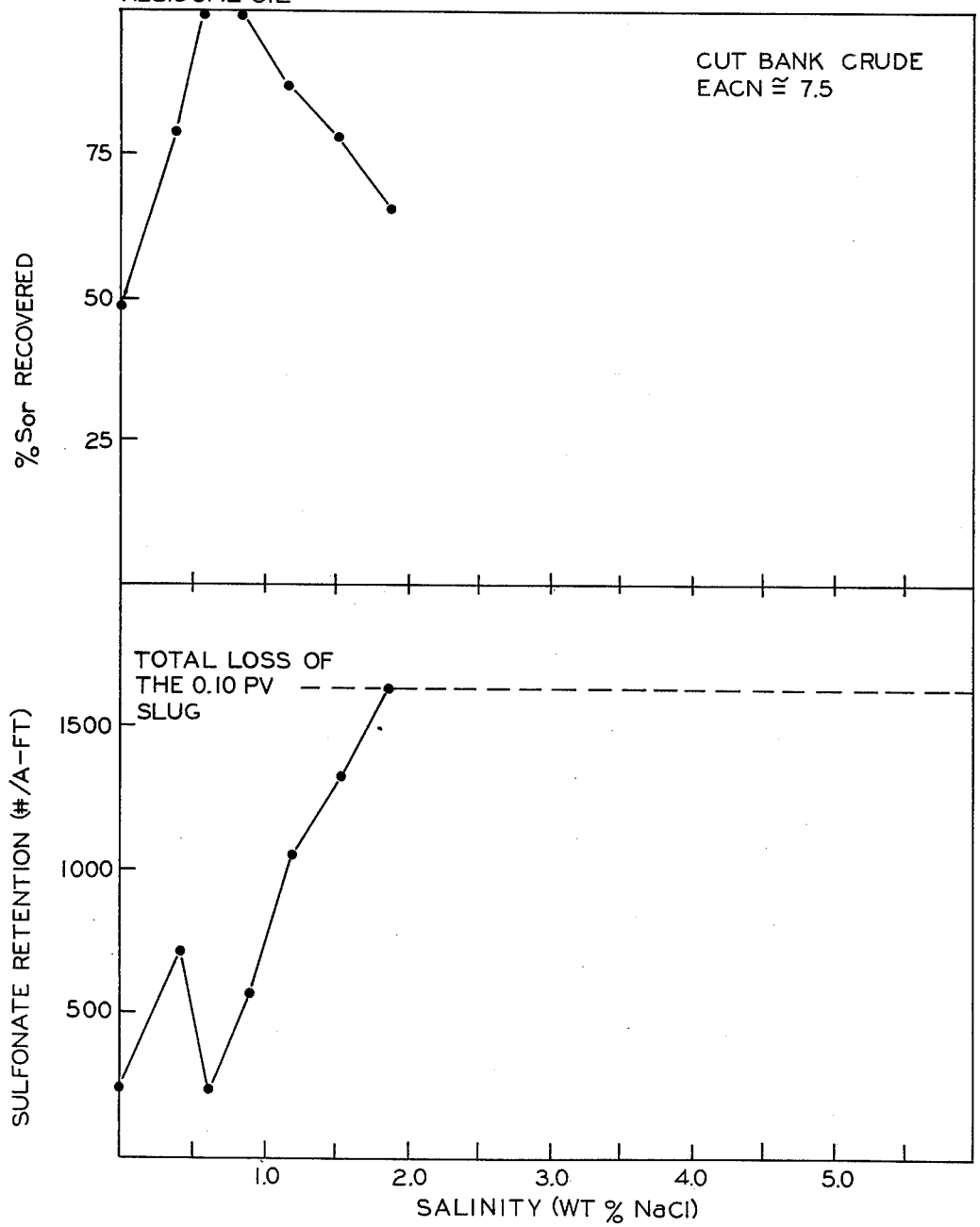
FIG. 14 shows the relationship between oil recovery and sulfonate retention.
Figure 15:
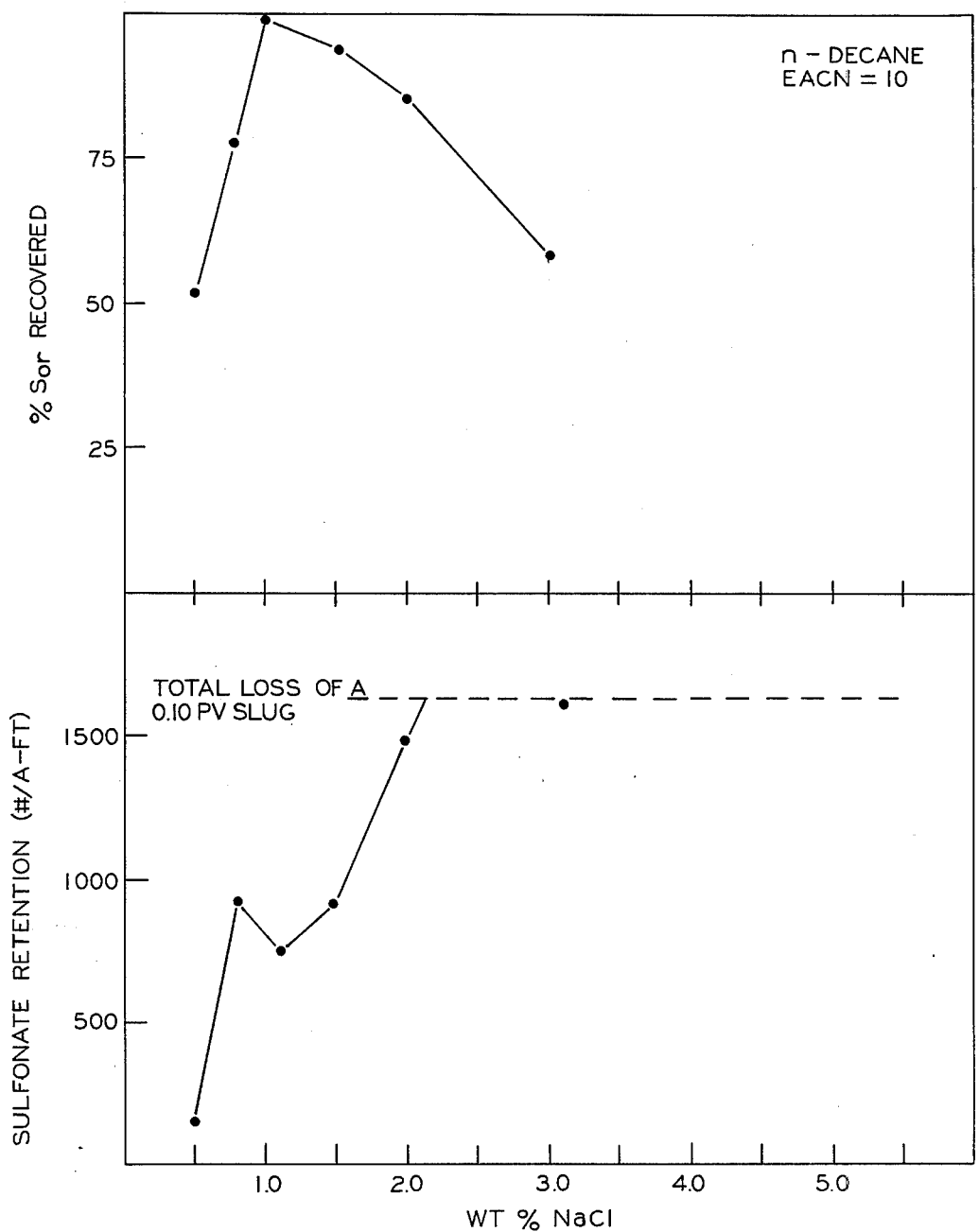
FIG. 15 shows the relationship between oil recovery and sulfonate retention with a different simulated oil.
Figure 16:
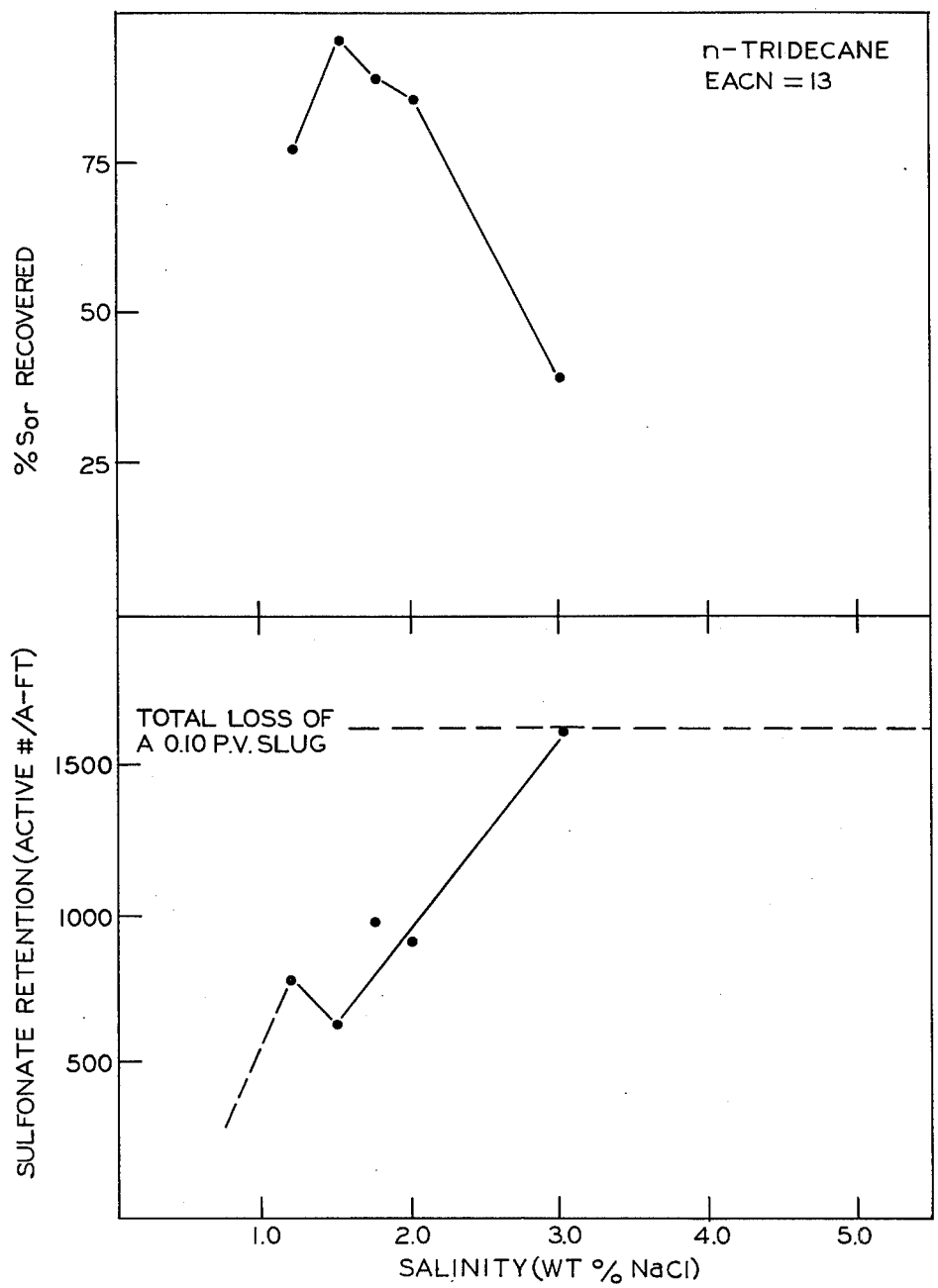
FIG. 16 shows the relationship between oil recovery and sulfonate retention with a different simulated oil.
Figure 17:
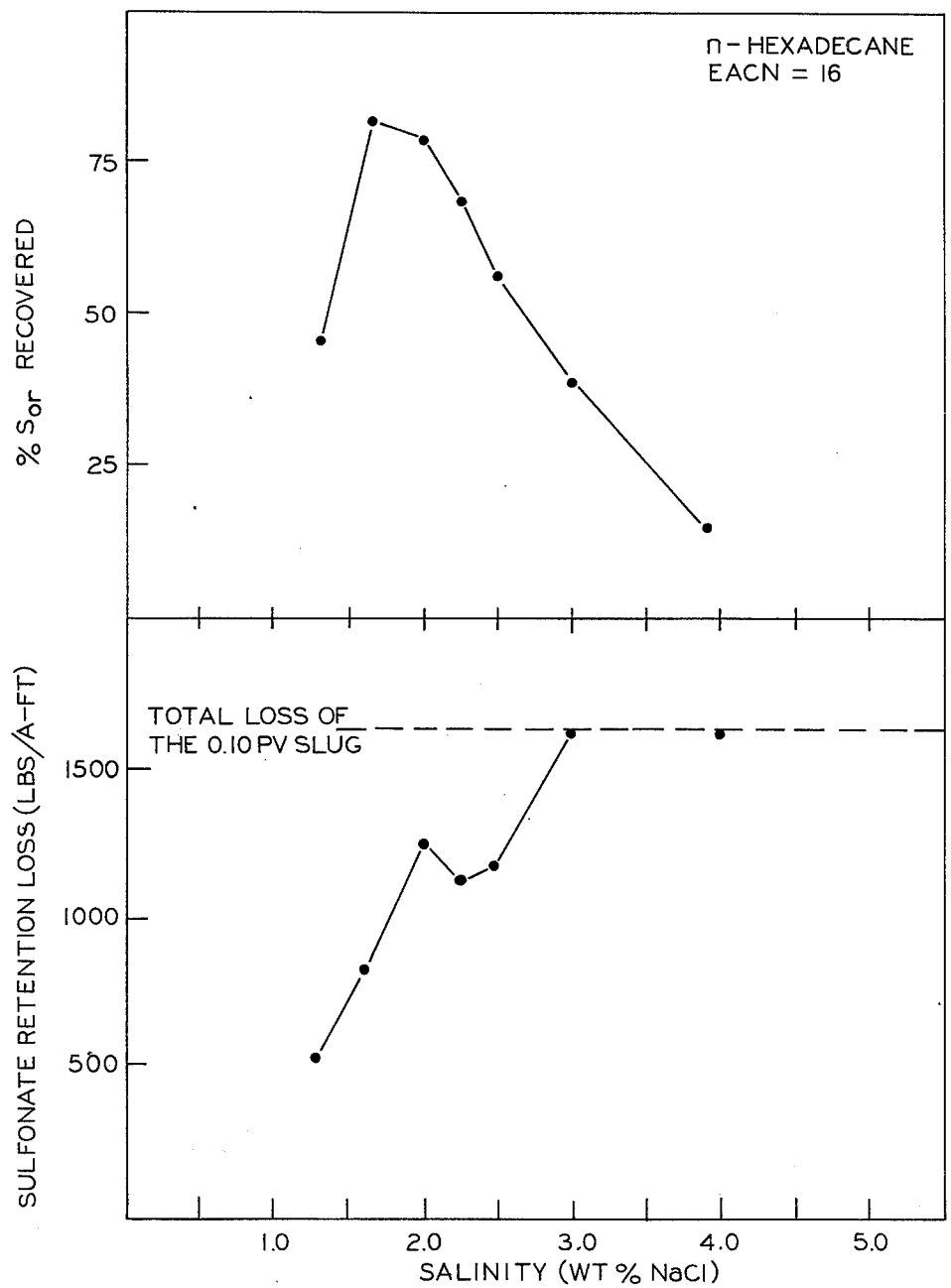
FIG. 17 shows the relationship between oil recovery and sulfonate retention with a different simulated oil.

It should also be noted in FIGS. 7 and 13 that for a given aqueous surfactant composition, the range of salinity over which the three-phase region exists decreases as the EACN of the oil decreases. Correspondingly, the ratios of $V_o/V_s$ and $V_w/V_s$ increase as preferred by the present invention.

In FIG. 13 it is also to be noted that maximum oil recovery with the TRS 10–410/isobutyl alcohol system shifts toward lower salinity within the three-phase region consistent with the $V_o/V_w$, $V_s/V_o$ and $V_s/V_w$ parameters set out in this disclosure.

Obviously, in an oil reservoir formation, the characteristics of the oil are relatively fixed. The salinity is variable to the extent that the formation can be conditioned by preflushing. For a given reservoir system, the characteristics of the surfactant and cosurfactant can be manipulated as discussed hereinabove to yield phase behavior as preferred by the present invention. In particular, $V_o/V_s$ and $V_w/V_s$ can be increased by increasing the equivalent weight of the surfactant and/or decreasing the water solubility of the cosurfactant.

TABLE IV

Slug Sequence for Oil (n-Decane) Displacement Tests

Preslug (0.50 PV)
    Contained 0.2% $Na_5P_3O_{10}$ + 0.1% $Na_2CO_3$ Prepared in corresponding "Resident" brine**

Surfactant Slug (0.10 PV)
    Contained 3% active (deoiled) TRS 10-410 + 3% isobutanol + 0.2% $Na_5P_3O_{10}$ + 0.1% $Na_2CO_3$ prepared in corresponding "REsident" brine**

Mobility Buffer (0.50 PV*)
    Betz Hi-Vis polymer solution prepared in "Resident" brine**.
    Polymer concentration was adjusted to yield viscosity of about 40 to 45 centipoise. (See below)***
    *A volume of mobility buffer equal to 0.5 PV was diluted continuously with brine at constant volume; i.e., polymer concentration was graded back logarithmically.

| Run No. | 8 | 9 | 10 | 11 | 12 | 13 |
|---|---|---|---|---|---|---|
| **Resident Brine (% NaCl) | 0.5 | 0.8 | 1.125 | 1.5 | 2.0 | 3.0 |
| ***Polymer Conc. (ppm) | 2000 | 2150 | 2300 | 2550 | 2860 | 3000 |
| ***Initial Buffer Visc (cp) | 48.5 | 40.5 | 40.2 | 41.5 | 45.1 | 42.5 |
| PV (cc) | 819 | 824 | 857 | 832 | 809 | 802 |
| $S_{oi}$ (% PV) | 61.4 | 60.9 | 60.0 | 61.3 | 60.5 | 60.9 |
| $S_{or}$ (% PV) | 33.6 | 33.3 | 32.9 | 33.5 | 33.4 | 33.5 |
| Specific Perm (md) | 571 | 604 | 640 | 660 | 658 | 557 |
| Brine Perm at $S_{or}$ (md) | 44 | 50 | 42 | 58 | 35 | 47 |
| Tertiary Oil Recovery (% $S_{or}$) | 52.3 | 78.0 | 98.7 | 94.7 | 86.1 | 58.7 |
| Total Oil Recovery (% $S_{oi}$) | 73.9 | 88.0 | 99.3 | 97.1 | 92.3 | 77.2 |
| Final Avg. Oil Satn (% Pv) | 16.0 | 7.3 | 0.4 | 1.8 | 4.6 | 13.9 |
| Frontal Velocity (ft/day) | 0.6 0.6 | 0.6 | 0.6 | 0.6 | 0.6 | |
| Maximum Avg.Press. Gradient | 1.2 | 0.6 | 0.4 | 0.5 | 0.5 | 2.7 |

TABLE V

Slug Sequence for Oil Displacement Tests (n-tridecane as "oil")

Preslug (0.50 PV)
    Contained 0.2% $Na_5P_3O_{10}$ + 0.1% $Na_2CO_3$ prepared in corresponding "resident" brine**

Surfactant Slug (0.10 PV)
    Contained 3% active (deoiled) TRS 10-410 + 3% Isobutanol + 0.2% $Na_5P_3O_{10}$ + 0.1% $Na_2CO_3$ prepared in corresponding "resident" brine**

Mobility Buffer (0.50 PV*)
    Betz Hi-Vis polymer solution prepared in "resident" brine. Polymer concentration was adjusted to yield viscosity of about 40 to 45 centipoise (See below)*.
    *A volume of mobility buffer equal to 0.5 PV was diluted continuously with brine at constant volume; i.e., polymer concentration was graded back logarithmically.

| Run No. | 14 | 15 | 16 | 17 | 18 |
|---|---|---|---|---|---|
| **Resident Brine (% NaCl in D.W.) | 1.20 | 1.50 | 1.75 | 2.00 | 3.00 |
| ***Polymer conc. (ppm) | 2480 | 2550 | 2590 | 2680 | 3000 |
| ***Initial Buffer Visc. (cp) | 44.2 | 42.5 | 36.5 | 41.6 | 42.0 |
| PV (cc) | 834 | 820 | 837 | 811 | 807 |
| $S_{oi}$ (% PV) | 63.4 | 64.2 | 64.3 | 64.0 | 63.2 |
| $S_{or}$ (% PV) | 34.9 | 34.2 | 33.9 | 34.8 | 34.2 |
| Specific Prem. (md) | 581 | 220 | 731 | 559 | 616 |
| Brine Perm. at $S_{or}$ (md) | 39 | 7 | 57 | 41 | 56 |
| Tertiary Oil Recovery (% $S_{or}$) | 77.7 | 96.2 | 89.9 | 86.3 | 39.6 |
| Total Oil Recovery (% $S_{oi}$) | 87.7 | 98.0 | 94.7 | 92.5 | 67.1 |
| Final Avg. Oil Satn (% PV) | 7.8 | 1.3 | 3.4 | 4.8 | 20.8 |
| Frontal Velocity (ft/day | 0.6 | 0.6 | 0.6 | 0.6 | 0.6 |

TABLE VI

Pertinent Results for Oil Displacement Tests Using n-Hexadecane as the Residual Oil

| Run No. | 19 | 20 | 21 | 22 | 23 | 24 | 25 |
|---|---|---|---|---|---|---|---|
| Resident Brine (% NaCl in D.W.) | 1.3 | 1.65 | 2.00 | 2.25 | 2.50 | 3.0 | 3.9 |
| Polymer Conc (ppm) | 2500 | 2575 | 2680 | 2750 | 2825 | 3000 | 3250 |
| Initial Buffer Visc (cp) | 32.8 | 42.9 | 47.5 | 43.5 | 39.7 | 42.0 | 31.7 |
| PV (cc) | 917 | 810 | 854 | 790 | 806 | 881 | 835 |
| $S_{oi}$ (% PV) | 63.1 | 64.1 | 62.4 | 60.5 | 64.2 | 63.0 | 64.3 |
| $S_{or}$ (% PV) | 34.8 | 35.2 | 35.5 | 33.8 | 34.6 | 35.1 | 35.3 |
| Specific Prem. (md) | 734 | 557 | 588 | 561 | 622 | 673 | 596 |
| Brine Perm at $S_{or}$ (md) | 72 | 32 | 36 | 34 | 40 | 55 | 45 |
| Tertiary Oil Recovery (% $S_{or}$) | 46.1 | 82.0 | 79.1 | 69.6 | 57.0 | 39.0 | 15.4 |
| Total Oil Recovery (% $S_{oi}$) | 70.3 | 90.1 | 88.4 | 83.0: | 76.8 | 66.1 | 53.5 |
| Final Avg. Oil Satn (% PV) | 18.7 | 6.3 | 7.2 | 10.3 | 14.9 | 21.4 | 29.9 |
| Frontal Velocity (ft/day) | 0.6 | 0.6 | 0.6 | 0.6 | 0.6 | 0.6 | 0.6 |

TABLE VI-continued

| | Pertinent Results for Oil Displacement Tests Using n-Hexadecane as the Residual Oil | | | | | | |
|---|---|---|---|---|---|---|---|
| Run No. | 19 | 20 | 21 | 22 | 23 | 24 | 25 |
| Max. Avg. Pressure Grad (psi/ft) | 0.7 | 0.8 | 0.8 | 1.0 | 0.8 | 1.3 | 5.9 |

EXAMPLE VI

This example demonstrates that an inherent advantage in regard to minimizing surfactant adsorption is recognized if the surfactant system is selected on the basis of criteria presented hereinabove. In the oil displacement tests, maximum oil recovery can be correlated with minimum sulfonate retention in the Berea sandstone cores. FIGS. 14, 15, 16 and 17 illustrate the coincidence of maximum oil recovery with minimum sulfonate retention at specific salinities. This further illustrates the advantage of selecting surfactant systems for tertiary oil recovery in accord with the present invention.

The sulfonate retention values were determined by material balance and said values are summarized in Table VII.

TABLE VII
Calculated Sulfonate Retention Values Based on Oil Displacement Runs in Berea Sandstone Cores

| Runs Using Cut Bank Crude as "Oil" | | | Runs Using n-tridecane as "Oil" | | |
|---|---|---|---|---|---|
| Test No. | Salinity (wt. % NaCl) | Sulfonate Retention* | Run No. | Salinity (wt. % NaCl) | Sulfonate Retention* |
| 1 | 0.0 | 200 | 14 | 1.20 | 790 |
| 2 | 0.4 | 710 | 15 | 1.50 | 640 |
| 3 | 0.6 | 230 | 16 | 1.75 | 980 |
| 4 | 0.9 | 570 | 17 | 2.00 | 920 |
| 5 | 1.20 | 1050 | 18 | 3.00 | 1600 |
| 6 | 1.55 | 1320 | | | |
| 7 | 1.90 | 1630** | | | |

| Runs Using n-decane as "Oil" | | | Runs Using n-hexadecane as "Oil" | | |
|---|---|---|---|---|---|
| 8 | 0.50 | 160 | 19 | 1.30 | 550 |
| 9 | 0.80 | 920 | 20 | 1.65 | 820 |
| 10 | 1.125 | 760 | 21 | 2.00 | 1250 |
| 11 | 1.50 | 930 | 22 | 2.25 | 1120 |
| 12 | 2.00 | 1490 | 23 | 2.50 | 1180 |
| 13 | 3.00 | 1630** | 24 | 3.00 | 1630** |
| | | | 25 | 3.90 | 1630** |

*Pounds of active ingredient retained per acre-foot of bulk volume.
**Total loss of the 0.10 PV surfactant slug.

EXAMPLE VII

This example demonstrates the effectiveness of surfactantflood systems in accord with the present invention which also contain a viscosifying agent such as water-soluble polymers. Addition of viscosifying agents to surfactant slug compositions may be desirable to meet the mobility requirements; particularly in reservoirs which contain viscous oils and/or those which contain relatively heterogeneous porous media.

Table VIII and Table IX show pertinent data for oil displacement tests wherein 10% pore volume surfactant slugs containing 3 weight percent active TRS 10–410, 3 weight percent isobutanol and 1000 ppm Betz Hi-Vis polyacrylamide were used to displace a 14 centipoise crude oil from 3-foot long Berea sandstone cores. The cores were reduced to a residual oil saturation as discussed in Example IV. In these tests, the cores were not rotated during the surfactantflood.

As is shown in Table IX, high oil recovery efficiency was obtained in the oil displacement tests. Tertiary oil recovery for these three tests ranged from 88 to 97 percent, averaging 93 percent of the waterflood residual. In all three systems studied, the corresponding phase behavior was similar and $V_o/V_w$ and $V_w/V_s$ were within the range preferred as outlined in Example I. (See Table X).

TABLE VIII

| | Slug Sequence for Oil Displacement Tests (78° F) | | |
|---|---|---|---|
| Run No. | 26 | 27 | 28 |
| Water used for solution preparations: | Distilled Water | SCBIW-2$^a$ | SCBW-1$^b$ |
| Preflush | | | |
| Size, PV | 0.4 | 0.4 | 0.4 |
| Composition of Salts Added, Wt. % | | | |
| NaCl | 0.0 | 0.2 | 0.75 |
| NaNO$_2$ | 1.125 | 0.000 | 0.00 |
| Na$_5$P$_3$O$_{10}$ | 0.20 | 0.40 | 0.40 |
| Na$_2$CO$_3$ | 0.10 | 0.10 | 0.10 |
| Surfactant Slug | | | |
| Size, PV | 0.10 | 0.10 | 0.10 |
| Composition, wt. % (plus salts in preflush) | | | |
| Active Witco TRS 10–410 | 3.00 | 3.00 | 3.0 |
| Isobutanol | 3.00 | 3.00 | 3.0 |
| Hi-Vis polyacrylamide | 0.10 | 0.10 | 0.10 |
| Added oil d | 1.5 | 1.5 | 1.5 |
| Mobility Buffer | | | |
| Amount, PV c | 0.5 | 0.5 | 0.5 |
| Peak viscosity, cp | 36 | 39 | 36 |
| Peak concentration of Betz Hi-Vis polyacrylamide, wt. % | 0.20 | 0.20 | 0.20 |
| Added Salts | 1.25% NaNO$_2$ | None | None |

$^a$Simulated brine containing 7500 ppm total dissolved solids.
$^b$Simulated brine containing 4200 ppm total dissolved solids.
$^c$A volume of the polymer solution equal to one-half the core PV (pore volume) was continuously diluted with brine containing the same salts as the polymer solution.
$^d$Necessary to make composition phase stable.

TABLE IX

Oil Displacement Test in 3-Foot Long Berea Cores

| Run No. | 26 | 27 | 28 |
|---|---|---|---|
| Core length (cm) | 86.3 | 87.3 | 86.8 |
| Core diameter (cm) | 7.6 | 7.6 | 7.6 |
| $S_{oi}$ (% PV) | 69.6 | 69.0 | 68.5 |
| $S_{or}$ (% PV) | 39.4 | 41.0 | 40.8 |
| PV (cc) | 759 | 790 | 833 |
| Specific Brine Perm. (md) | 627 | 411 | 690 |
| Brine Perm. at $S_{or}$ (md) | 25 | 15 | 38 |
| Connate Water Satn (%) | 30.4 | 31.0 | 31.5 |
| Tertiary Oil Recovery (%) | 95.7 | 96.5 | 88.1 |
| Total Oil Recovery (%) | 97.5 | 97.9 | 92.9 |
| Final Oil Satn (%) | 2.5 | 1.4 | 4.8 |
| Frontal Velocity (ft/day) | 0.6 | 0.6 | 0.6 |
| Max. Press. Gradient (psi/ft) | 0.8 | 0.8 | 0.90 |

TABLE X

Phase Volume and Interfacial Tension Behavior for Equilibrated Systems and Containing Equal Volumes of Crude oil and Surfactant Compositions Used in Runs 26, 27 and 28

| | At Equilibrium | | |
|---|---|---|---|
| | Volume Fraction | | Interfacial Tension |
| Run No. | Bottom* | Top** | (dynes/cm) |
| 26 | .358 | .642 | .00068 |
| 27 | .360 | .640 | .0032 |
| 28 | .360 | .640 | .00075 |

*Predominantly aqueous phase.
**Surfactant rich microemulsion phase.

EXAMPLE VIII

This example compares oil displacement efficiency for surfactantflood processes as preferred by the present invention (i.e., an in situ formed multiphase microemulsion system) as opposed to aqueous surfactantflood compositions which do not form the in situ microemulsion systems. For purposes of comparison, the surfactant slug compositions in both types of systems were designed to yield approximately equal and effective interfacial tension values against the crude oil of interest. A water-soluble polyacrylamide polymer was added to the surfactant compositions so as to provide viscosity to the surfactant slug to meet the mobility requirements.

Figure 18:
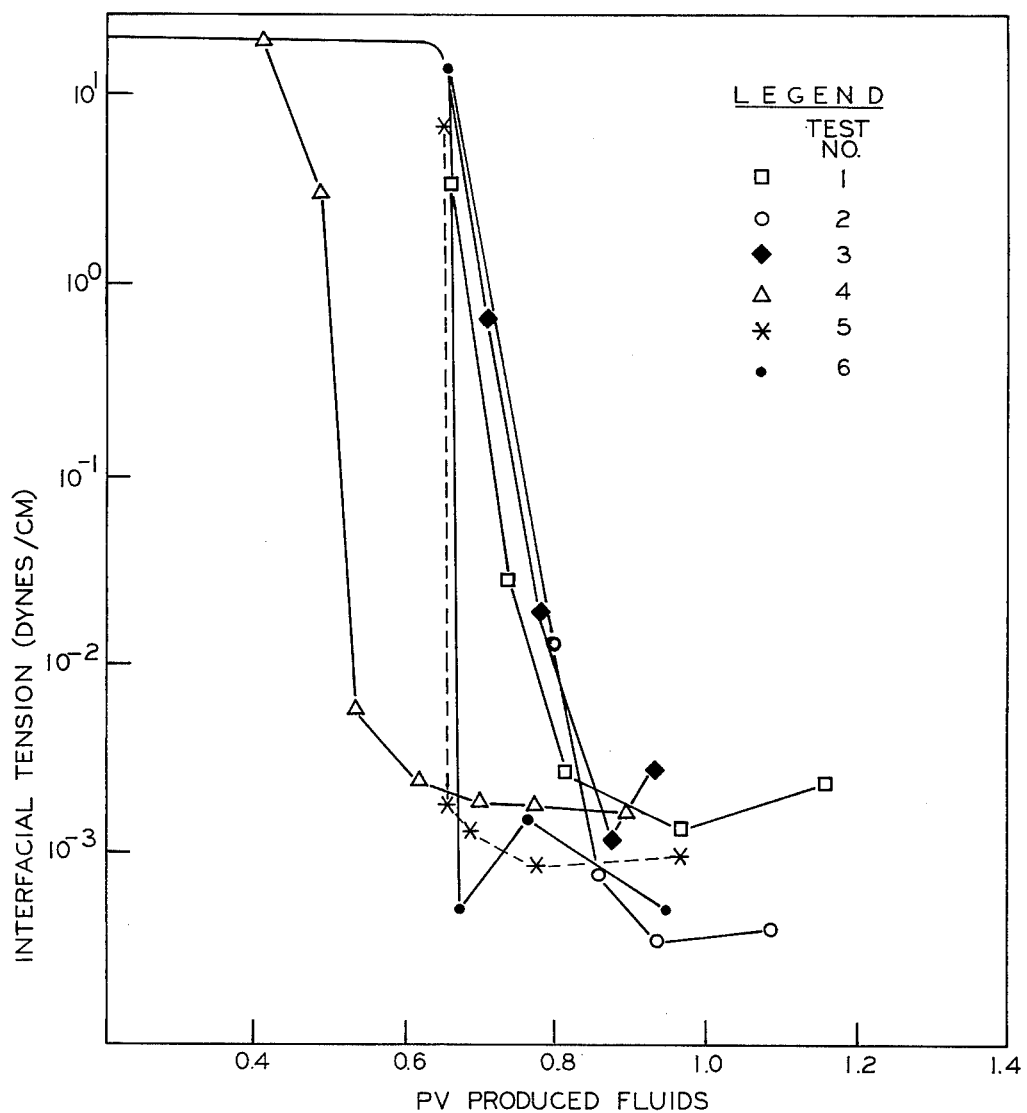
FIG. 18 shows the relationship between interfacial tension of effluent phases as a functional of pore volume of produced fluids for oil displacement tests.

For purposes of this example, results of oil displacement tests discussed in Example VII are used for comparison. Table XI shows the slug sequence and pertinent data for oil displacement tests (Tests 29, 30 and 31) conducted in Berea sandstone cores containing waterflood residual oil (a 14 centipoise crude) using 0.10 pore volume slugs of an aqueous low tension system which does not form the in situ microemulsion system. Equilibration of equal volumes of these surfactant slug compositions with the crude oil resulted in a predominantly aqueous phase in equilibrium with a predominantly oil phase, i.e., no microemulsion phase was formed. As is shown in Table XI, successively greater polymer concentrations were used in the surfactant and mobility buffer slugs in an attempt to assure that adequate mobility control was being achieved. The results in FIG. 18 show that in all of the tests, the low interfacial tension front was propagated through the cores (less than 0.002 dyne/cm). In spite of these necessary and desirable conditions, tertiary oil recoveries under these conditions were only in the range of 45 to 63 percent.

This compares with the aforementioned tertiary oil recoveries of 88 to 97 percent for similar runs (Runs No. 26, 27 and 28) conducted using surfactant compositions which do form the in situ multiphase microemulsion system as preferred in this invention (see Example VII). The results show that surfactantflood compositions which form the in situ microemulsion system recover substantially more oil at relatively lower pressure gradients. This was true in spite of the fact that low interfacial tension fronts were propagated through the cores for all of the tests (see FIG. 18). This is believed due to the fact that in the systems which form the in situ microemulsion, the phase behavior is controlled in a relatively simple but effective manner avoiding viscous emulsion formation and utilizing the inherent advantages of these preferred multiphase microemulsion systems.

TABLE XI

Slug Sequences for Oil Displacement Test

Composition (wt. %)[a]

| Slug | Slug Size (PV) | Active Petroleum Sulfonate[b] | Betz Hi-Vis[c] | $Na_2SO_4$ | $Na_2CO_3$ | $Na_5P_3O_{10}$ | Betz Hi-Vis Run 29 | Run 30 | Run 31 |
|---|---|---|---|---|---|---|---|---|---|
| Preslug | 0.25 | — | — | 4.0 | 0.10 | 0.4 | 0.0 | 0.0 | 0.0 |
| Surf Slug. | 0.10 | 3.0 | 0.20 | 4.0 | 0.10 | 0.4 | 0.005 | 0.20 | 0.30 |
| Mobility Buffer | Continuous | — | 0.20 | 4.0 | 0.10 | 0.4 | 0.30 | 0.30 | 0.30 |

Oil Displacement Test in 3-Foot Long Berea Cores

| | Run 29 | Run 30 | Run 31 |
|---|---|---|---|
| Core Length (cm) | 87.7 | 88.6 | 88.5 |
| Core diameter (cm) | 7.6 | 7.6 | 7.6 |
| $S_{oi}$ (% PV) | 65.2 | 70.1 | 69.4 |
| $S_{or}$ (% PV) | 42.2 | 43.5 | 42.1 |
| PV (cc) | 843 | 738 | 754 |
| Specific Brine Perm. (md) | 465 | 184 | 442 |
| Brine Perm. at $S_{or}$ (md) | 25.7 | 16.7 | 21.0 |
| Connate Water Satn (%) | 57.8 | 56.6 | 57.9 |
| Tertiary Oil Recovery (%) | 45.4 | 56.9 | 62.8 |
| Total Oil Recovery (%) | 64.5 | 73.3 | 77.46 |
| Final Oil Satn (%) | 23.1 | 15.7 | 15.8 |
| Frontal Velocity (ft/day) | 0.56 | 0.68 | 0.66 |
| Max. Press. Gradient (psi/ft) | 3.7 | 5.7 | 4.5 |
| Surfactant Slug Viscosity (cp) | 5.0 | 24.1 | 61.0 |
| Mobility Buffer Viscosity (cp) | 52.5 | 39.4 | 61.0 |

[a]Solution for Tests prepared in a simulated field water containing 4200 ppm total dissolved solids.
[b]Active ingredient Stepan Agent 587-50-2 (IPA-water extracted, Necton 37 oil blended with the petroleum sulfonate at 1:1 total oil to active sulfonate ratio).
[c]$NaNO_2$ (0.5 wt. %) was added to solutions to reduce oxygen degradation of the polymer.

While this invention has been described in detail for the purpose of illustration, it is not to be construed as limited thereby but is intended to cover all changes and modifications within the spirit and scope thereof.

I claim:

1. A process for preparing an optimized aqueous surfactant system comprising:
    (a) preparing a series of aqueous surfactant systems at different brine concentrations, the surfactant of said series of surfactant systems having a relatively small hydrophobic portion; mixing each surfactant system separately with a series of pure hydrocarbons from a homologous series and allowing the mixtures to equilibrate;
    (b) determining the relative volume of the phases in the resulting equilibrated mixtures in (a) and preparing a phase volume diagram for each hydrocarbon;
    (c) mixing oil from a formation to be produced with at least one surfactant-brine composition of the type used in (a), allowing the resulting mixture to equilibrate and comparing it with the phase volume diagrams of (b); and
    (d) using said comparison of (c) in conjunction with the relationship that increasing electrolyte concentration is equivalent to increasing the hydrophobic portion of said surfactant to prepare a new aqueous surfactant system thus adjusted so as to yield upon contact with said oil of said formation, three phases over a narrow range of salinity.

2. A method according to claim 1 wherein said each surfactant system of said series of surfactant systems contains a cosurfactant and wherein said new surfactant system is a surfactant-cosurfactant-brine prepared using (1) a surfactant having a greater hydrophobic portion and/or a less water-soluble cosurfactant than those of said series of surfactant systems, and (2) a concentration of salt in the brine of said surfactant-cosurfactant-brine corresponding to that wherein three phases form or to that just adjacent to where three phases form on said contact with said oil corresponding to said formation oil, the concentration of said surfactant in said series of aqueous surfactant systems being within the range of 1 to 7 weight percent based on the weight of water and said cosurfactant being present in said series of surfactant systems in an amount such that a cosurfactant/surfactant ratio is within the range of 0.25:1 to 1.5:1, and wherein substantially equal volumes of said surfactant system and said oil are mixed.

3. A method according to claim 2 wherein said surfactant is a petroleum sulfonate and wherein sid hydrophobic portion is increased by using a sulfonate having an equivalent weight sufficiently greater than that of (a) to decrease the range of salinity over which three phases form to less than about 1 percentage point but no more greater than the minimum amount necessary to effect this decrease.

4. A method according to claim 3 wherein said surfactant of (a) is a petroleum sulfonate toward the lower end of a 375–500 average equivalent weight range and said higher equivalent weight sulfonate is toward the upper end of said 375–500 average equivalent weight range.

5. A method according to claim 3 wherein said surfactant of (a) is a petroleum sulfonate with an average equivalent weight within the range of 400 to 200.

6. A method according to claim 3 wherein said cosurfactant of said series of surfactant systems has a solubility toward the intermediate portion of a 0.5 to 20 grams per 100 grams of water range and said less soluble cosurfactant has a solubility toward the lower end of said 0.5 to 20 grams per 100 grams of water range.

7. A method according to claim 3 wherein said cosurfactant of said series of surfactant systems is isobutyl alcohol.

8. A method according to claim 3 wherein said new surfactant system is injected into a reservoir through at least one injection well where it contacts oil in said reservoir to form in situ a microemulsion, thereafter a mobility buffer fluid is injected, and thereafter a drive fluid is injected, forcing oil from said reservoir toward a recovery well.

9. A method according to claim 8 wherein said injection of said new surfactant system is preceded by a preflush having a salinity similar to that of said new surfactant system.

10. A method according to claim 1 wherein said aqueous surfactant composition contains a water-soluble polymer as a viscosifying agent.

11. A method according to claim 1 wherein said new surfactant system on equilibration with a substantially equal volume of oil from said reservoir forms three phases and wherein $V_o/V_w$ in the microemulsion phase is in the range of 0.1 to 10 and $V_s/V_o$ in the microemulsion phase is less than 1.

12. A method according to claim 1 wherein said new surfactant system on equilibration with a substantially equal volume of oil from said reservoir forms two phases, a brine-rich microemulsion phase and an oil phase and wherein $V_o/V_w$ in the microemulsion phase is greater than 0.05 and $V_s/V_o$ is less than 1.5, and wherein said two-phase region is near the three-phase region.

13. A method according to claim 1 wherein said new surfactant system on equilibration with a substantially equal volume of oil from said reservoir forms two phases, an aqueous phase and an oil-rich microemulsion phase, and wherein $V_w/V_o$ in the microemulsion phase is greater than 0.05 and $V_s/V_w$ in the microemulsion phase is less than 1.5, and wherein said two-phase region is near the three-phase region.

14. A process for recovering oil from a subterranean oil-bearing reservoir comprising the steps of
    (a) injecting into said reservoir through at least one injection well, an aqueous surfactant system comprising water, electrolyte, surfactant and cosurfactant which surfactant system corresponds in surfactant and cosurfactant composition to a system which on contact with oil corresponding to that in said reservoir forms three phases, a predominantly oil phase, an immiscible microemulsion phase, and a predominantly aqueous phase over a range of electrolyte concentration of less than 1 percentage point by weight based on the weight of said water, the injected surfactant system having a concentration of said electrolyte in said water within a 1 percentage point range beginning at about the point said formation of three phases starts and encompassing the three-phase region;
    (b) contacting said surfactant system with said oil in said reservoir;
    (c) thereafter injecting a drive fluid thus forcing said oil toward at least one recovery well; and
    (d) recovering said oil.

15. A method according to claim 14 wherein said electrolyte is present in a concentration within the range of 5,000 to 25,000 parts by weight per million parts by weight of water; said surfactant system which is injected into said reservoir contains said surfactant in a concentration within the range of 1–7 weight percent based on the weight of said water and contains said cosurfactant in a concentration within the range of 1–7 weight percent based on the weight of said water; said surfactant is a petroleum sulfonate having an average equivalent weight within the range of 375–500; and said cosurfactant has a solubility in water within the range of 0.5 to 20 grams per 100 grams of water; and wherein said drive fluid is preceded by a mobility buffer.

16. A method according to claim 15 wherein said formation of three phases occurs over a range of electrolyte concentration of less than 0.5 of a percentage point and said cosurfactant is a $C_4$ or $C_5$ alcohol.

17. A method according to claim 15 wherein said electrolyte is predominantly sodium chloride, said injected surfactant system is essentially free of oil and is preceded by a preflush.

18. A method according to claim 14 wherein said aqueous surfactant composition contains a water-soluble polymer as a viscosifying agent.

19. A process for recovering oil from a subterranean oil-bearing reservoir comprising: injecting into said reservoir through at least one injection well a substantially oil-free aqueous surfactant system comprising a surfactant and brine, said surfactant system characterized in that on contact with a substantially equal volume of formation crude oil, said surfactant system takes up said oil and forms three phases, a predominantly oil phase, a predominantly aqueous phase, and a surfactant-rich microemulsion phase, wherein said microemulsion phase has a $V_o/V_w$ of 0.1 to 10, and a $V_s/V_w$ of less than 1.0, said phases having interfacial tensions less than about 0.1 dynes/cm, said thus formed microemulsion being immiscible with said predominantly oil phase and with said aqueous phase; forcing said oil toward at least one recovery well; and recovering said oil.

20. A process according to claim 19 wherein said $V_o/V_w$ is near unity, and said $V_s/V_w$ is less than 0.5.

21. A method according to claim 19 wherein said brine substantially corresponds to formation brine in said reservoir.

22. A method according to claim 19 wherein said surfactant composition is prepared using a brine differing in salinity from that of the formation brine and wherein said surfactant composition is preceded by a preflush having a salinity substantially corresponding to that of said brine of said surfactant system.

23. A method according to claim 19 wherein said surfactant is a petroleum sulfonate having an equivalent weight within the range of 375 to 500, said brine has an electrolyte concentration within the range of 5,000 to 25,000 parts by weight per million parts by weight water, and wherein said surfactant system contains in addition a cosurfactant.

24. A method according to claim 23 wherein said cosurfactant is a $C_4$ or $C_5$ alcohol.

25. A method according to claim 23 wherein said $V_w/V_o$ in the microemulsion phase is greater than 0.2 and said $V_s/V_w$ in the microemulsion phase is less than 0.5 and said interfacial tension is less than 0.01.

26. A method according to claim 19 wherein said aqueous surfactant composition contains a water-soluble polymer as a viscosifying agent.

27. A process for recovering oil from a subterranean oil-bearing reservoir comprising: injecting into said reservoir through at least one injection well, a substantially oil-free aqueous surfactant system comprising a surfactant and a brine, said surfactant system characterized in that on contact with a substantially equal volume of said formation oil said surfactant system takes up said oil to form two phases, a predominantly aqueous phase and an oil-rich surfactant-rich microemulsion phase, said microemulsion phase having a $V_w/V_o$ greater than 0.05 and $V_s/V_w$ less than 1.5, said phases having an interfacial tension of less than 0.1 dynes/cm, said thus formed microemulsion phase being immiscible with said predominantly aqueous phase; forcing said oil toward at least one recovery well; and recovering said oil.

28. A method according to claim 27 wherein formation brine in said reservoir is substantially identical to said brine of said surfactant system.

29. A method according to claim 27 wherein formation brine in said reservoir is substantially different in composition from said brine of said surfactant system and said surfactant system is preceded by a preflush using a brine substantially corresponding to that of said surfactant system.

30. A method according to claim 29 wherein said $V_o/V_w$ in the microemulsion phase is greater than 0.2, said $V_s/V_o$ in the microemulsion phase is less than 0.5, and said interfacial tension is less than 0.01 dynes/cm.

31. A composition according to claim 29 wherein said brine of said surfactant system substantially corresponds to brine in said formation.

32. A method according to claim 29 wherein brine in said formation differs in composition from said brine of said surfactant system and wherein said surfactant system is preceded by a preflush having a brine content substantially corresponding to that of said surfactant system.

33. A method according to claim 29 wherein said surfactant is a petroleum sulfonate having an equivalent weight within the range of 375 to 500, said brine has an electrolyte concentration within the range of 5,000 to 25,000 parts by weight per million parts by weight water, and wherein said surfactant system contains in addition a cosurfactant.

34. A method according to claim 33 wherein said cosurfactant is a $C_4$ or $C_5$ alcohol.

35. A method according to claim 27 wherein said surfactant is a petroleum sulfonate having an equivalent weight within the range of 375 to 500, said brine has an electrolyte concentration within the range of 5,000 to 25,000 parts by weight per million parts by weight water, and wherein said surfactant system contains in addition a cosurfactant.

36. A method according to claim 35 wherein said cosurfactant is a $C_4$ or $C_5$ alcohol.

37. A method according to claim 27 wherein said aqueous surfactant composition contains a water-soluble polymer as a viscosifying agent.

38. A process for recovering oil from a subterranean oil-bearing reservoir comprising: injecting into said reservoir through at least one injection well a substantially oil-free aqueous surfactant system comprising a surfactant and a brine characterized in that on contact with a substantially equal volume of said oil in said reservoir, said surfactant system takes up said oil to form two phases, a predominantly oil phase and a predominantly water-rich, surfactant-rich microemulsion phase, said microemulsion phase having a $V_o/V_w$ greater than 0.05, a $V_s/V_o$ less than 1.5, said phases having interfacial tension of less than 0.1 dynes/cm, said microemulsion thus formed being immiscible with said predominantly oil phase; forcing said oil toward at least one recovery well; and recovering said oil.

39. A method according to claim 38 wherein said aqueous surfactant composition contains a water-soluble polymer as a viscosifying agent.

* * * * *

UNITED STATES PATENT AND TRADEMARK OFFICE
CERTIFICATE OF CORRECTION

PATENT NO. : 4,125,156

DATED : November 14, 1978

INVENTOR(S) : Gilbert R. Glinsmann

It is certified that error appears in the above-identified patent and that said Letters Patent are hereby corrected as shown below:

Column 27, line 1 of claim 25, change "claim 23" to --- claim 27 ---;

Column 28, line 1 of claim 30, change "claim 29" to --- claim 38 ---;

Column 28, line 1 of claim 31, change "claim 29" to --- claim 38 ---;

Column 28, line 1 of claim 32, change "claim 29" to --- claim 38 ---;

Column 28, line 1 of claim 33, change "claim 29" to --- claim 38 ---.

Signed and Sealed this

Fourteenth Day of October 1980

[SEAL]

Attest:

SIDNEY A. DIAMOND

Attesting Officer

Commissioner of Patents and Trademarks

Disclaimer

4,125,156.—*Gilbert R. Glinsmann*, Bartlesville, Okla. AQUEOUS SURFACTANT SYSTEMS FOR IN SITU MULTIPHASE MICROEMULSION FORMATION. Patent dated Nov. 14, 1978. Disclaimer filed Aug. 12, 1980, by the assignee, *Phillips Petroleum Company*.

Hereby enters this disclaimer to claims 12 and 13 of said patent.

[*Official Gazette December 9, 1980.*]